United States Patent
Jin et al.

(10) Patent No.: US 12,182,911 B2
(45) Date of Patent: Dec. 31, 2024

(54) IMAGE GENERATION METHOD, IMAGE GENERATION APPARATUS, AND IMAGE GENERATION SYSTEM

(71) Applicant: Preferred Networks, Inc., Tokyo (JP)

(72) Inventors: Yanghua Jin, Tokyo (JP); Huachun Zhu, Tokyo (JP); Yingtao Tian, Tokyo (JP)

(73) Assignee: Preferred Networks, Inc., Tokyo (JP)

(*) Notice: Subject to any disclaimer, the term of this patent is extended or adjusted under 35 U.S.C. 154(b) by 211 days.

(21) Appl. No.: 17/447,081

(22) Filed: Sep. 8, 2021

(65) Prior Publication Data

US 2021/0398336 A1 Dec. 23, 2021

Related U.S. Application Data

(63) Continuation of application No. PCT/US2019/022688, filed on Mar. 18, 2019.

(60) Provisional application No. 62/816,315, filed on Mar. 11, 2019.

(51) Int. Cl.
| | |
|---|---|
| G06T 11/60 | (2006.01) |
| G06F 18/25 | (2023.01) |
| G06N 3/045 | (2023.01) |
| G06N 3/047 | (2023.01) |
| G06N 3/049 | (2023.01) |
| G06N 3/065 | (2023.01) |

(Continued)

(52) U.S. Cl.
CPC .............. *G06T 11/60* (2013.01); *G06F 18/25* (2023.01); *G06N 3/049* (2013.01); *G06T 13/40* (2013.01); *G06N 3/045* (2023.01); *G06N 3/047* (2023.01); *G06N 3/065* (2023.01); *G06N 3/126* (2013.01)

(58) Field of Classification Search
CPC ......... G06T 11/60; G06T 13/40; G06F 18/25; G06N 3/049; G06N 3/045; G06N 3/047; G06N 3/065; G06N 3/126
See application file for complete search history.

(56) References Cited

U.S. PATENT DOCUMENTS

| | | | |
|---|---|---|---|
| 8,692,830 B2 * | 4/2014 | Nelson ................. | G06V 40/171 345/581 |
| 9,734,613 B2 * | 8/2017 | Kim ........................ | G06T 17/20 |
| 9,965,871 B1 * | 5/2018 | Li ...................... | G06F 18/24323 |

(Continued)

FOREIGN PATENT DOCUMENTS

| | | |
|---|---|---|
| JP | 2002-139987 | 5/2002 |
| JP | 2016-502713 | 1/2016 |

(Continued)

OTHER PUBLICATIONS

Chartsias et al, "Multimodal MR Synthesis via Modality-Invariant Latent Representation", 201813, IEEE (Year: 2018).*

(Continued)

*Primary Examiner* — YuJang Tswei
(74) *Attorney, Agent, or Firm* — IPUSA, PLLC

(57) ABSTRACT

An image generation apparatus includes at least one memory, and at least one processor configured to acquire first latent information of a first image and second latent information of a second image, generate fusion latent information by using the first latent information and the second latent information, and generate a fusion image by inputting the fusion latent information into a trained generative model.

25 Claims, 18 Drawing Sheets

(51) Int. Cl.
   *G06N 3/126* (2023.01)
   *G06T 13/40* (2011.01)

(56) References Cited

U.S. PATENT DOCUMENTS

| | | | |
|---|---|---|---|
| 2007/0018980 A1* | 1/2007 | Berteig | G06T 15/80 345/426 |
| 2014/0201126 A1* | 7/2014 | Zadeh | A61B 5/165 706/52 |
| 2016/0026926 A1 | 1/2016 | Yeung et al. | |
| 2016/0140519 A1* | 5/2016 | Trepca | G06N 7/01 705/26.44 |
| 2016/0217387 A1 | 7/2016 | Okanohara et al. | |
| 2017/0236177 A1* | 8/2017 | Sebastian | G06Q 30/0208 705/14.11 |
| 2018/0204111 A1* | 7/2018 | Zadeh | G06V 10/764 |
| 2018/0349303 A1 | 12/2018 | Hamada et al. | |
| 2019/0034581 A1* | 1/2019 | Aliper | G16B 40/20 |
| 2019/0043351 A1* | 2/2019 | Yang | G06F 18/24133 |
| 2019/0347706 A1* | 11/2019 | Sumit | G06N 3/045 |
| 2020/0023273 A1 | 1/2020 | Tsurusaki et al. | |
| 2020/0034545 A1 | 1/2020 | Takao | |
| 2020/0202622 A1* | 6/2020 | Gallo | G06T 15/10 |
| 2020/0210808 A1* | 7/2020 | Dong | G06N 3/084 |
| 2021/0001223 A1 | 1/2021 | Zhang et al. | |
| 2021/0001235 A1 | 1/2021 | Zhang et al. | |

FOREIGN PATENT DOCUMENTS

| | | |
|---|---|---|
| JP | 2017-189476 | 10/2017 |
| JP | 2018-171271 | 11/2018 |
| JP | 2018-173711 | 11/2018 |
| JP | 2019-003402 | 1/2019 |
| JP | 2021-526282 | 9/2021 |
| JP | 2021-526430 | 10/2021 |

OTHER PUBLICATIONS

Zhou et al., "Effective feature learning and fusion of multimodality data using stage-wise deep neural network for dementia diagnosis", Oct. 3, 2018, Wiley (Year: 2018).*
Basu et al—A Probabilistic Framework for Semi-Supervised Clustering—2004—ACM (Year: 2004).*
Hubbard et al—Comparing Population Average and Mixed Models for Estimating the Associations Between Neighborhood Risk Factors and Health—2010—Lippinco (Year: 2010).*
Kumar et al—Self-Paced Learning for Latent Variable Models—Stanford University—2010 (Year: 2010).*
NIPS-2004-conditional-random-fields-for-object-recognition-Paper (Year: 2004).*
Training Products of Experts by Minimizing Contrastive Divergence—Hinton—2002—MIT (Year: 2002).*
DCGAN face generator demo, Author unlisted, <URL: http://mattya.github.io/chainer-DCGAN/>, 2019.03.07 version <URL: https://web.archive.org/web/20190307113440/http://mattya.github.io/chainer-DCGAN/>.
Cryptomons | Ethereum digital collectible card game, Author unlisted, <URL: https://cryptomons.com/>, Jun. 9, 2018 version <URL: https://web.archive.org/web/20180609080117/https://cryptomons.com/>.
CryptoPets, Author unlisted, <URL: https://www.cryptopets.co/Home/>, Feb. 16, 2019. version <URL: https://web.archive.org/web/20190216090956/https://cryptopets.co/Home/>.
Gene A.I.dols | Gene Idle, Author unlisted, <URL: https://gene-aidols.io/>, Retrieved on Jul. 5, 2021.
GitHub—LinkIdol/TronProducer: Tron Idol, Author unlisted, <URL: https://github.com/LinkIdol/TronProducer>, Retrieved on Sep. 6, 2021.
Huachun Zhu, "Crypko white paper Cryptocollectible Game Using Generative Adversarial Network (GAN) ver 0.8.0", Published Jun. 30, 2018, <URL: https://crypko.ai/static/files/crypko-whitepaper-ja.pdf>, Retrieved on Jul. 28, 2019.
Huachun Zhu, crypko/white-paper-ja.tex at master—makegirlsmoe/crypko—GitHub, Jun. 3, 2018, <URL: https://github.com/makegirlsmoe/crypko/blob/master/white-paper/white-paper-ja.tex>, Retrieved on Jul. 28, 2019.
Yanghua Jin, Crypko Official Twitter, <URL: https://twitter.com/crypko>, Feb. 24, 2019 version <URL: https://web.archive.org/web/20190224003054if_/https://twitter.com/crypko>.
CryptoKitties | Collect and breed digital cats!, Author unlisted, <URL: https://www.cryptokitties.co/>, Retrieved on Jul. 5, 2021.
Girl Friend Factory, Author unlisted, <URL: https://hiroshiba.github.io/girl_friend_factory/index.html>, Retrieved on Aug. 18, 2021.
RPG Maker MV, Kadokawa Corporation, <URL: http://tkool.jp/mv/>, Mar. 6, 2019 version <URL: https://web.archive.org/web/20190306135724/http://tkool.jp/mv/>.
Huachun Zhu, "Encryption girl white paper Encrypted collectible game based on generative confrontation network ver 0.8.0", Published Apr. 30, 2018, <URL: https://crypko.ai/static/files/crypko-whitepaper-cn.pdf>, Retrieved on Jul. 28, 2019.
Huachun Zhu, crypko/white-paper-cn.tex at master • makegirlsmoe/crypko • GitHub, Jun. 3, 2018, <URL: https://github.com/makegirlsmoe/crypko/blob/master/white-paper/white-paper-cn.tex>, Retrieved on Jul. 28, 2019.
"Generate a 2D beautiful girl character with 1 click, Interview with a Chinese student who made the net buzz with deep learning", ITmedia Inc., Aug. 11, 2018, <URL: https://nlab.itmedia.co.jp/nl/articles/1808/04/news031.html>.
Huachun Zhu, Discord chat history, May 20, 2018, <URL: https://discordapp.com/channels/436014732042960899/438602771177144320/447682450483707917>, Retrieved on Jul. 26, 2019.
Cafe Nemuriya, Crypko White Paper Japanese Translation, Jun. 30, 2018, <URL: https://cafe-nemuriya.com/2018/06/05/post-2669/>, Retrieved on Mar. 24, 2020.
Etheremon—Decentralized World of Ether Monsters, Author unlisted, <URL: https://www.etheremon.com/>, Jul. 24, 2018 version <URL: https://web.archive.org/web/20180724092555/https://www.etheremon.com/>.
MakeGirlsMoe—Create Anime Characters with A.I.!, Author unlisted, <URL: https://make.girls.moe/#/>, Feb. 24, 2019 version <URL: https://web.archive.org/web/20190224003057/https://make.girls.moe/#/>.
MakeGirls.moe Official Blog, "Create Anime Characters with A.I. !", Author unlisted, <URL: https://makegirlsmoe.github.io/main/2017/08/14/news-english.html>, Nov. 15, 2018 version <URL: https://web.archive.org/web/20181115153601/https://makegirlsmoe.github.io/main/2017/08/14/news-english.html>.
MakeGirls.moe Official Blog, "Web Interface Update: Hack the Noise and More", Author unlisted, <URL: https://makegirlsmoe.github.io/main/2017/08/16/hack-noise.html>, Oct. 27, 2018 version <URL: https://web.archive.org/web/20181027223030/https://makegirlsmoe.github.io/main/2017/08/16/hack-noise.html>.
Yanghua Jin et al., "Towards the Automatic Anime Characters Creation with Generative Adversarial Networks", Aug. 18, 2017.
Yanghua Jin et al., "Towards the High-quality Anime Characters Generation with Generative Adversarial Networks", <URL: https://nips2017creativity.github.io/doc/High_Quality_Anime.pdf>, Jun. 25, 2018 version <URL: https://web.archive.org/web/20180625074723/https://nips2017creativity.github.io/doc/High_Quality_Anime.pdf>.
Crypko & MakeGirlsMoe—GitHub, Author unlisted, <URL: https://github.com/makegirlsmoe>, Feb. 19, 2019 version <URL: https://web.archive.org/web/20190219144035/https://github.com/makegirlsmoe>.
Huachun Zhu, GitHub—makegirlsmoe/crypko, Jun. 3, 2018, <URL: https://github.com/makegirlsmoe/crypko>, Retrieved on Aug. 10, 2021.
Alec Radford et al., "Unsupervised Representation Learning With Deep Convolutional Generative Adversarial Networks", Revised Jan. 7, 2016.
CryptoCountries—World Domination on the Ethereum Blockchain, Author unlisted, <URL: https://cryptocountries.io/> Feb. 14, 2019 version <URL: https://web.archive.org/web/20190214164031/https://cryptocountries.io/>.

(56) References Cited

OTHER PUBLICATIONS

CryptoFighters | Collect, battle, trade!, Author unlisted, <URL: https://cryptofighters.io/>, Dec. 2, 2018 version <URL: https://web.archive.org/web/20181202051011/https://cryptofighters.io/>.

Tero Karras et al., "Progressive Growing of GANs for Improved Quality, Stability, and Variation", Revised Feb. 26, 2018.

Diederik P. Kingma et al., "Auto-Encoding Variational Bayes", Revised May 1, 2014.

Augustus Odena et al., "Conditional Image Synthesis with Auxiliary Classifier GANs", Revised Jul. 20, 2017.

Huachun Zhu, "Crypko White Paper A Cryptocollectible Game Empowered by Generative Adversarial Networks", Published Apr. 30, 2018, <URL: https://crypko.ai/static/files/crypko-whitepaper.pdf>, Feb. 24, 2019 version <URL: https://web.archive.org/web/20190224003058/https://crypko.ai/static/files/crypko-whitepaper.pdf>.

Yanghua Jin, Tweet by Crypko Official, Apr. 29, 2018, <URL: https://twitter.com/Crypko/status/990824639428358144>, Retrieved on Jul. 30, 2019.

Yanghua Jin, Tweet by Aixile, May 21, 2018, <URL: https://twitter.com/_aixile/status/998785156956569601>, Retrieved on Jul. 30, 2019.

Yanghua Jin, Tweet by Aixile, May 21, 2018, <URL: https://twitter.com/_aixile/status/998784934247464960>, Retrieved on Jul. 30, 2019.

Yanghua Jin, Tweet by Aixile, Jul. 30, 2018, <URL: https://twitter.com/_aixile/status/1024095289513132033>, Retrieved on Jul. 30, 2019.

Yanghua Jin, Tweet by Crypko Official, Aug. 4, 2018, <URL: https://twitter.com/Crypko/status/1025915284123607040>, Retrieved on Jul. 30, 2019.

Yanghua Jin, Tweet by Crypko Official, Aug. 4, 2018, <URL: https://twitter.com/Crypko/status/1025914462476222464>, Retrieved on Jul. 30, 2019.

Yanghua Jin, Tweet by Crypko Official, Aug. 6, 2018, <URL: https://twitter.com/Crypko/status/1026397462557159424>, Retrieved on Jul. 30, 2019.

Yanghua Jin, Tweet by Crypko Official, Aug. 6, 2018, <URL: https://twitter.com/Crypko/status/1026397242763038720>, Retrieved on Jul. 30, 2019.

Huachun Zhu, Discord chat history, Jul. 6, 2018, <URL: https://discordapp.com/channels/436014732042960899/438604075588911105/464760573754736660>, Retrieved on Jul. 26, 2019.

Huachun Zhu, Discord chat history, May 23, 2018, <URL: https://discordapp.com/channels/436014732042960899/438604075588911105/448659529740320772>, Retrieved on Jul. 26, 2019.

Huachun Zhu, Discord chat history, Jun. 4, 2018, <URL: https://discordapp.com/channels/436014732042960899/438604075588911105/453012145777410048>, Retrieved on Jul. 26, 2019.

Huachun Zhu, crypko/white-paper-en.tex at master—makegirlsmoe/crypko—GitHub, Jun. 3, 2018, <URL: https://github.com/makegirlsmoe/crypko/blob/master/white-paper/white-paper-en.tex>, Retrieved on Jul. 28, 2019.

Huachun Zhu, Contract 0xAb908BD1f8E31064eAe1130cEE30fd30eAE9f47F, Jul. 10, 2018, <URL: https://rinkeby.etherscan.io/address/0xab908bd1f8e31064eae1130cee30fd30eae9f47f#code>, Retrieved on Jul. 23, 2019.

Blockchaingamer.net, Exclusive Interview With The Crypko Team (Interviewee: Yanghua Jin et al.), Jun. 13, 2018, <URL: https://blockchaingamer.net/exclusive-interview-with-the-crypko-team/>, Retrieved on Aug. 17, 2021.

Mehdi Mirza et al., "Conditional Generative Adversarial Nets", Nov. 6, 2014.

Datagrid Inc., Development of idle auto generation AI, Jun. 19, 2018, <URL: https://datagrid.co.jp/all/release/33/>, Retrieved on Aug. 6, 2021, with English version of the website.

Datagrid Inc., Development of automatic character generation AI jointly with Area Co., Ltd., Jun. 19, 2018, <URL: https://datagrid.co.jp/all/release/35/>, Retrieved on Aug. 6, 2021, with English version of the website.

Datagrid Inc., ICOVO releases the Dapp game "Gene Aldols" in collaboration with Oltz, Feb. 14, 2019, <URL: https://datagrid.co.jp/all/release/324/>, Retrieved on Aug. 6, 2021, with English version of the website.

Yanghua Jin et al., Anime Expo 2018, in U.S.A., Jul. 6, 2018, "Crypko.ai:Generating Anime Characters using Deep Learning".

Yanghua Jin, "One Minute Exploration in Crypko Space", Apr. 30, 2018, <URL: https://www.youtube.com/watch?v=AXAouosx95Y>.

AIP Riken, "25.Yanghua Jin: Creating Anime Characters with GAN", Jun. 11, 2018, <URL: https://www.youtube.com/watch?v=UDT_2IHv8o8>.

Yanghua Jin, "Crypko: bridging blockchains and GANs", Apr. 29, 2018, <URL: https://www.slideshare.net/YanghuaJin/crypko-bridging-blockchains-and-gans?ref=https://crypko.ai/>.

Yanghua Jin, Tokyo Deep Learning Workshop 2018, in Japan, Mar. 21, 2018, "Exploring the Anime Characters Creation with Generative Adversarial Networks".

Yunjey Choi et al., "StarGAN: Unified Generative Adversarial Networks for Multi-Domain Image-to-Image Translation", Nov. 24, 2017.

An J. Goodfellow et al., "Generative Adversarial Nets", Jun. 10, 2014.

Sepp Hochreiter et al., "Long Short-Term Memory", Neural Computation 9, 1735-1780, 1997.

Joseph Poon et al., "Plasma: Scalable Autonomous Smart Contracts", Aug. 10, 2017.

Jun-Yan Zhu et al., "Unpaired Image-to-Image Translation using Cycle-Consistent Adversarial Networks", Mar. 30, 2017.

Jun-Yan Zhu et al., "Unpaired Image-to-Image Translation using Cycle-Consistent Adversarial Networks", Revised Nov. 15, 2018.

Commits • makegirlsmoe/makegirlsmoe_web • GitHub, Author unlisted, <URL: https://github.com/makegirlsmoe/makegirlsmoe_web/commits/master>, Retrieved on Jun. 29, 2021.

Etherwaifu—Artwork Trading Game on the Ethereum Blockchain, Author unlisted, <URL: https://etherwaifu.com/>, Retrieved on Jul. 8, 2021.

Author unlisted, "Fishbank Decentralized Deep Ocean Food Chain Game on Smart Contracts", Position Paper Edition 1E, Mar. 18, 2018, <URL: https://fishbank.io/whitepaper/FISHBANK-V1.pdf>, Oct. 3, 2019 version <URL: https://web.archive.org/web/20191003013645/https://fishbank.io/whitepaper/FISHBANK-V1.pdf>.

CryptoKitties: Collectible and Breedable Cats Empowered by Blockchain Technology, Author unlisted, <URL: https://drive.google.com/file/d/1soo-eAaJHzhw_XhFGMJp3VNcQoM43byS/view>, Retrieved on Jul. 5, 2021.

Yanghua Jin and Huachun Zhu, Crypko AI Blockchain Anime, Apr. 30, 2018, <URL: https://crypko.ai/#/>, Mar. 2, 2019 version <URL: https://web.archive.org/web/20190302224109if_/https://crypko.ai/#/>.

Tweets by CryptoLandmarks, Feb. 8, 2018, <URL: https://twitter.com/cryptolandmarks?lang=en>, Retrieved on Aug. 18, 2021.

* cited by examiner

FIG.1
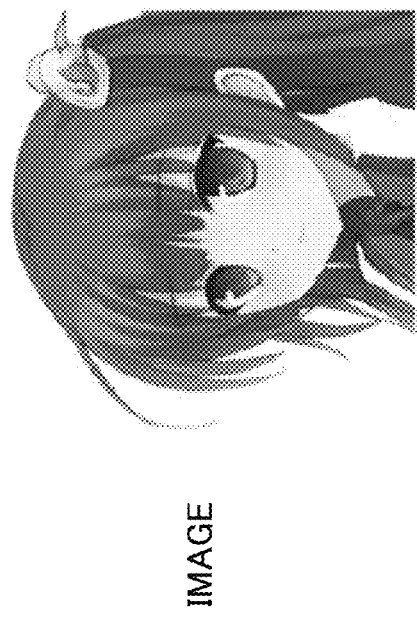
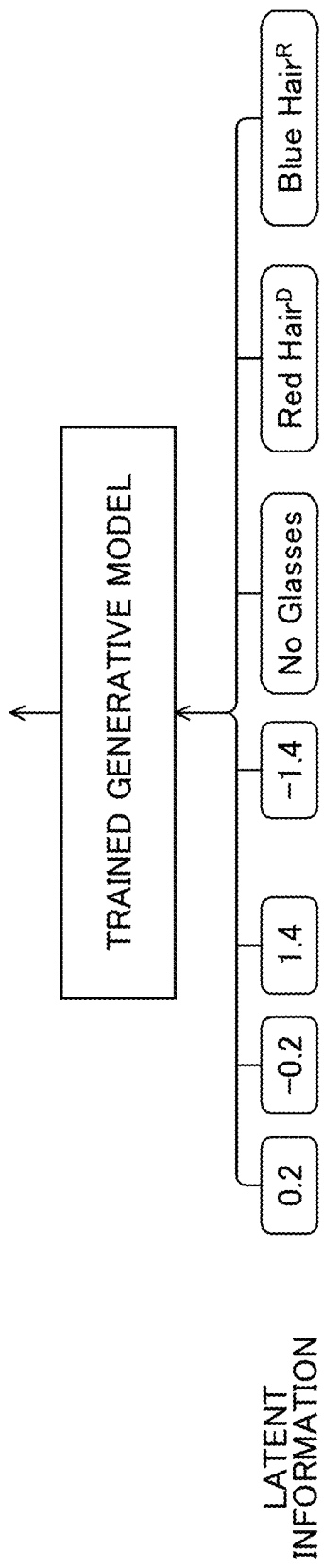

FIG.16
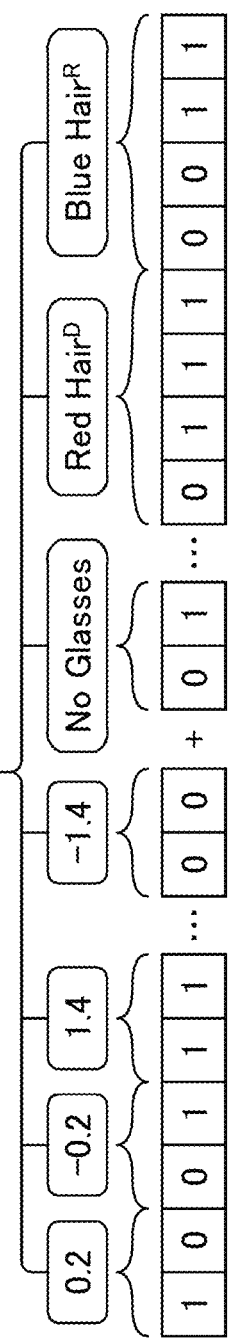

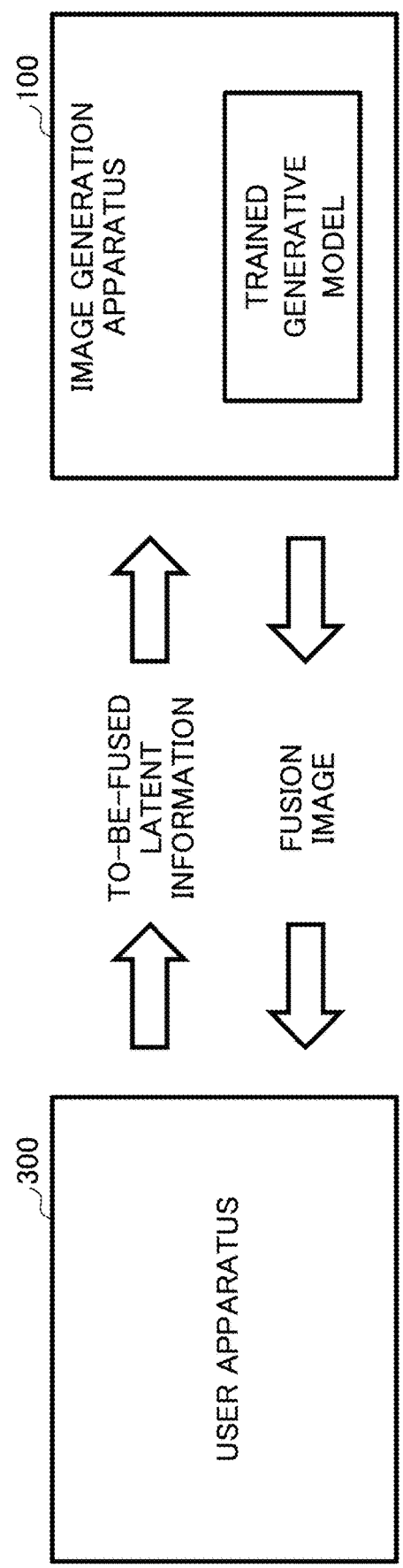

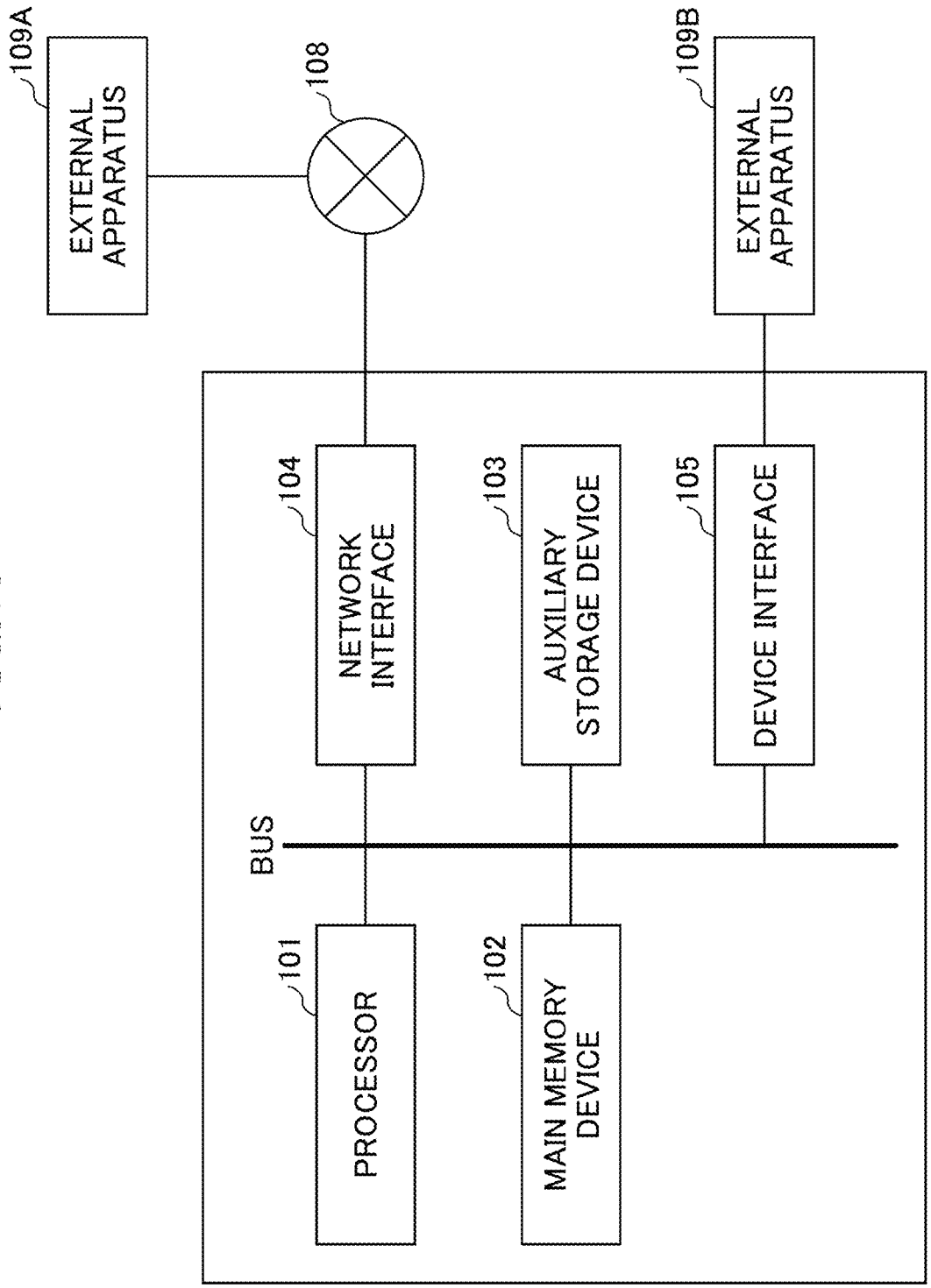

IMAGE GENERATION METHOD, IMAGE GENERATION APPARATUS, AND IMAGE GENERATION SYSTEM

CROSS-REFERENCE TO RELATED APPLICATIONS

This application is a continuation application of International Application No. PCT/US2019/022688 filed on Mar. 18, 2019, and designating the U.S., which is based upon and claims priority to U.S. Provisional Patent Application No. 62/816,315 filed on Mar. 11, 2019, the entire contents of which are incorporated herein by reference.

BACKGROUND

1. Technical Field

The present disclosure relates to an image generation method, an image generation apparatus, and an image generation system.

2. Description of the Related Art

In networks such as the Internet, sites, or platforms for providing various tools are provided. For example, some platforms are operated on the Internet for providing tools to enable users to generate digital images, such as an avatar image and a character image, by means of provided parts and to edit, release or exchange the generated digital images.

For example, in CryptoKitties, users are allowed to create an image of a new kitten based on images of its parents and trade users' possessed kitten images with use of cryptocurrencies.

However, the kitten images created at CryptoKitties are combinations of parts (for example, eyes, ears and so on) of the parent cats, and there are few unique characteristics and variations.

It is desirable to provide a novel image generation technique.

SUMMARY

According to one aspect of the present disclosure, an image generation apparatus includes at least one memory, and at least one processor configured to acquire first latent information of a first image and second latent information of a second image, generate fusion latent information by using the first latent information and the second latent information, and generate a fusion image by inputting the fusion latent information into a trained generative model.

BRIEF DESCRIPTION OF THE DRAWINGS

FIG. 1 is a schematic diagram that depicts an image generation operation according to one embodiment of the present disclosure;

FIG. 16 is a schematic diagram that depicts an image generation operation according to another embodiment of the present disclosure;

FIG. 18 is a schematic diagram that depicts an image generation system according to one embodiment of the present disclosure; and FIG. 19 is a block diagram that depicts a hardware arrangement of an image generation apparatus, a training apparatus and a user apparatus according to one embodiment of the present disclosure.

DETAILED DESCRIPTION

Embodiments of the present disclosure are described below with reference to the drawings. In the following embodiments, an image generation apparatus and an image generation method for generating digital images are described.

Outline of Present Disclosure

An image generation apparatus according to embodiments of the present disclosure fuses latent information (for example, genetic codes, attributes or the like) of two images to be fused in accordance with a predetermined operation (for example, a genetic operation or the like) to generate fusion latent information and supplies the generated fusion latent information to a trained generative model to generate a fusion image of the two images.

Figure 2:
FIG. 2 is a diagram that depicts a digital image according to one embodiment of the present disclosure.
Figure 3:
FIG. 3 is a diagram that depicts a digital image according to one embodiment of the present disclosure.
Figure 4:
FIG. 4 is a diagram that depicts a digital image according to one embodiment of the present disclosure.

Specifically, a character image as illustrated in FIG. 1 is characterized by the latent information including a code (for example, a genetic code, which may be referred to as a noise) and an attribute (for example, a hair style, a hair color, an eye color, a skin color, an expression, an attachment such as glasses or a hat, or the like, all or a part of which may be used). For example, an image generation apparatus according to the embodiments described below may fuse the latent information of two to-be-fused character images as illustrated in FIGS. 2 and 3 and supply the fusion latent information to a trained generative model (for example, a machine learning model such as a generator trained in accordance with GANs (Generative Adversarial Networks)) to generate a fusion image as illustrated in FIG. 4.

According to the present disclosure, the image generation apparatus can generate a variety of unique fusion images with succession of codes and attributes of the latent information of both the images rather than simple combinations of parts of the incoming images. Also, totally harmonious fusion images can be generated with use of the generative model.

Image Generation Apparatus

Figure 5:
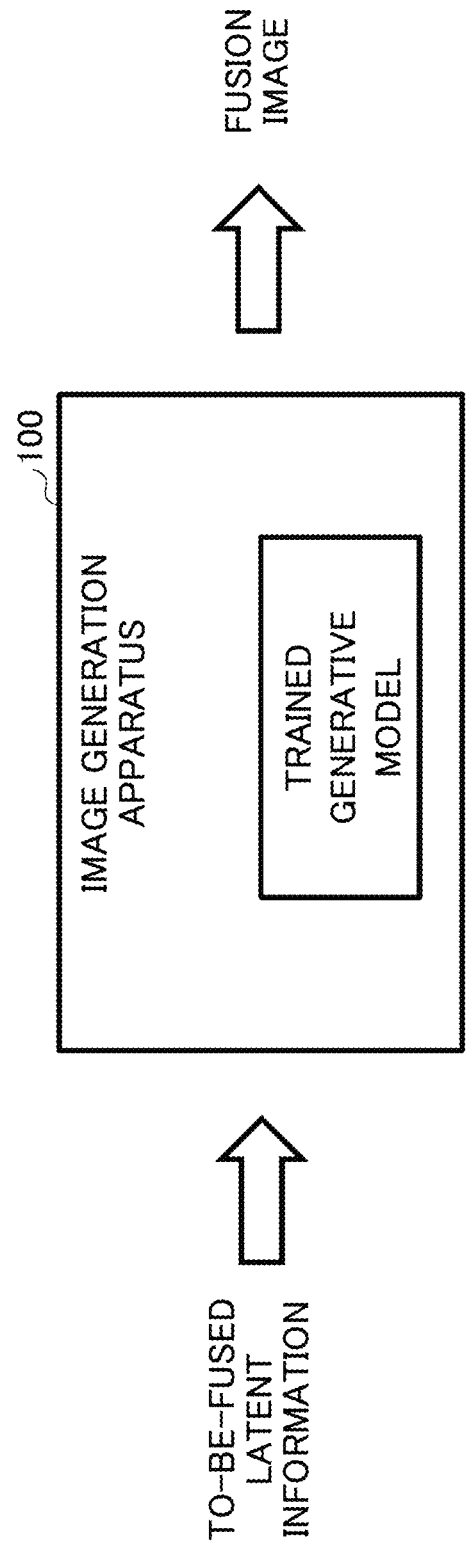
FIG. 5 is a schematic diagram that depicts an image generation apparatus according to one embodiment of the present disclosure.

First of all, an image generation apparatus according to one embodiment of the present disclosure will be described with reference to FIGS. 5 to 11. FIG. 5 is a schematic diagram for illustrating an image generation apparatus according to one embodiment of the present disclosure.

As illustrated in FIG. 5, an image generation apparatus 100 has a trained generative model. Upon acquiring latent information of two to-be-fused images, the image generation apparatus 100 fuses the acquired latent information, in accordance with a predetermined operation, to generate fusion latent information. Then, the image generation apparatus 100 supplies the generated fusion latent information to the generative model to generate a fusion image.

Specifically, the image generation apparatus 100 may be for implementing a platform for image generation and provide the platform via a website, for example. In one example, when a user logging in the platform indicates two to-be-fused images, the image generation apparatus 100 acquires latent information of the user's indicated two images and fuses the acquired latent information in accordance with a predetermined operation. For example, the operation may be a genetic operation such as crossover, mutation, and selection, and a composite operation, such as an arithmetic operation, a logical operation or the like, on the latent information. Then, the image generation apparatus 100 may use the trained generative model to generate a fusion image from the fusion latent information and provide the generated fusion image to the user on the platform.

Note that although the trained generative model is provided in the image generation apparatus 100 in the illustrated embodiment, the present disclosure is not limited to it, and the trained generative model may be located at an external apparatus that is communicatively connected to the image generation apparatus 100, for example. In this case, the image generation apparatus 100 may send the fusion latent information to the external apparatus and acquire the fusion image generated by the trained generative model from the external apparatus.

Figure 6:
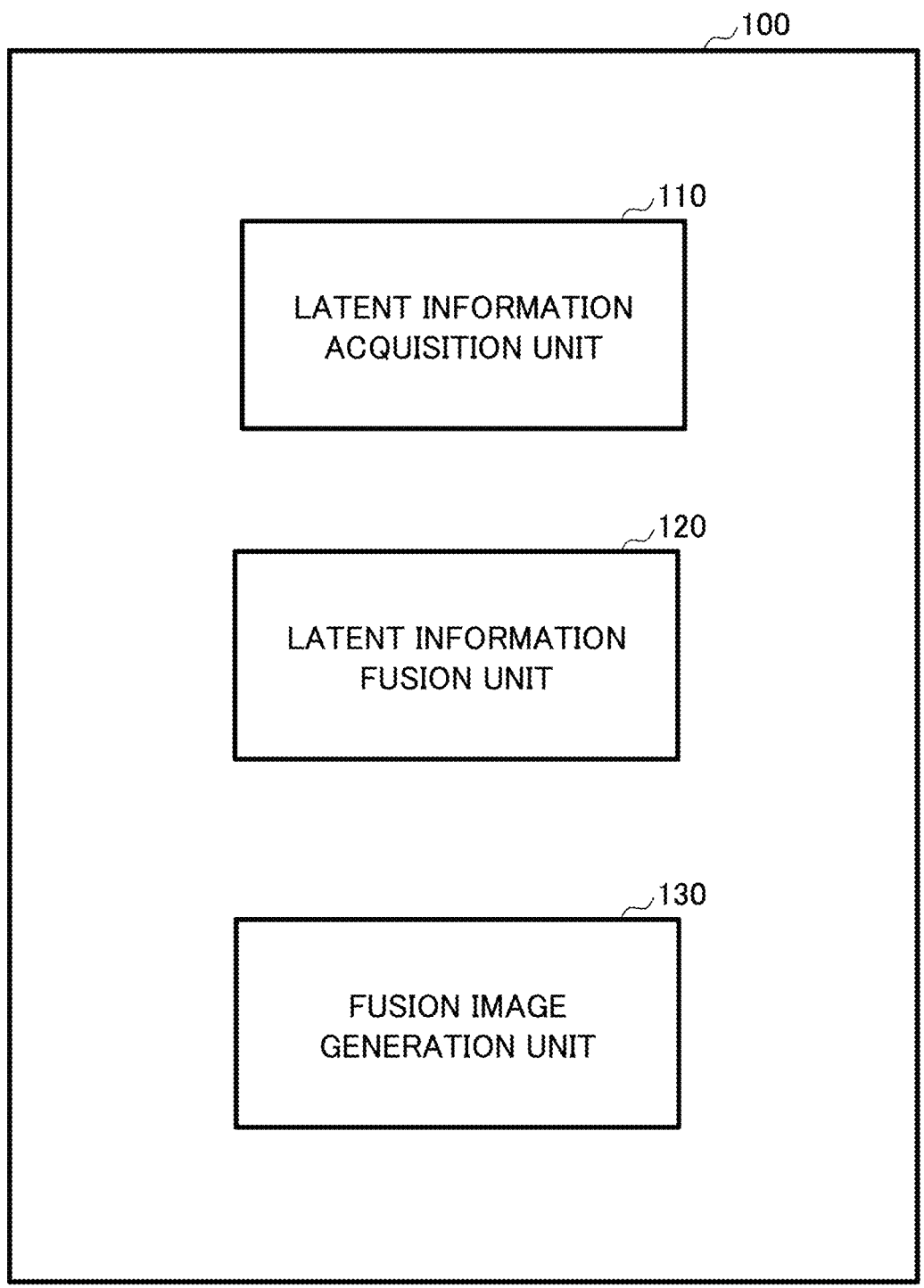
FIG. 6 is a block diagram that depicts a functional arrangement of an image generation apparatus according to one embodiment of the present disclosure.

FIG. 6 is a block diagram for illustrating a functional arrangement of an image generation apparatus according to one embodiment of the present disclosure. As illustrated in FIG. 6, the image generation apparatus 100 includes a latent information acquisition unit 110, a latent information fusion unit 120 and a fusion image generation unit 130.

The latent information acquisition unit 110 acquires respective latent information of two to-be-fused images. For example, the to-be-fused image may be a bitmap image such as an avatar image or a character image and be associated with the latent information for characterizing an object, such as an avatar, a character, or the like. The latent information used herein may be information that may be put into a latent variable inferred from observation data (for example, image data) through a model or the like.

Figure 7:
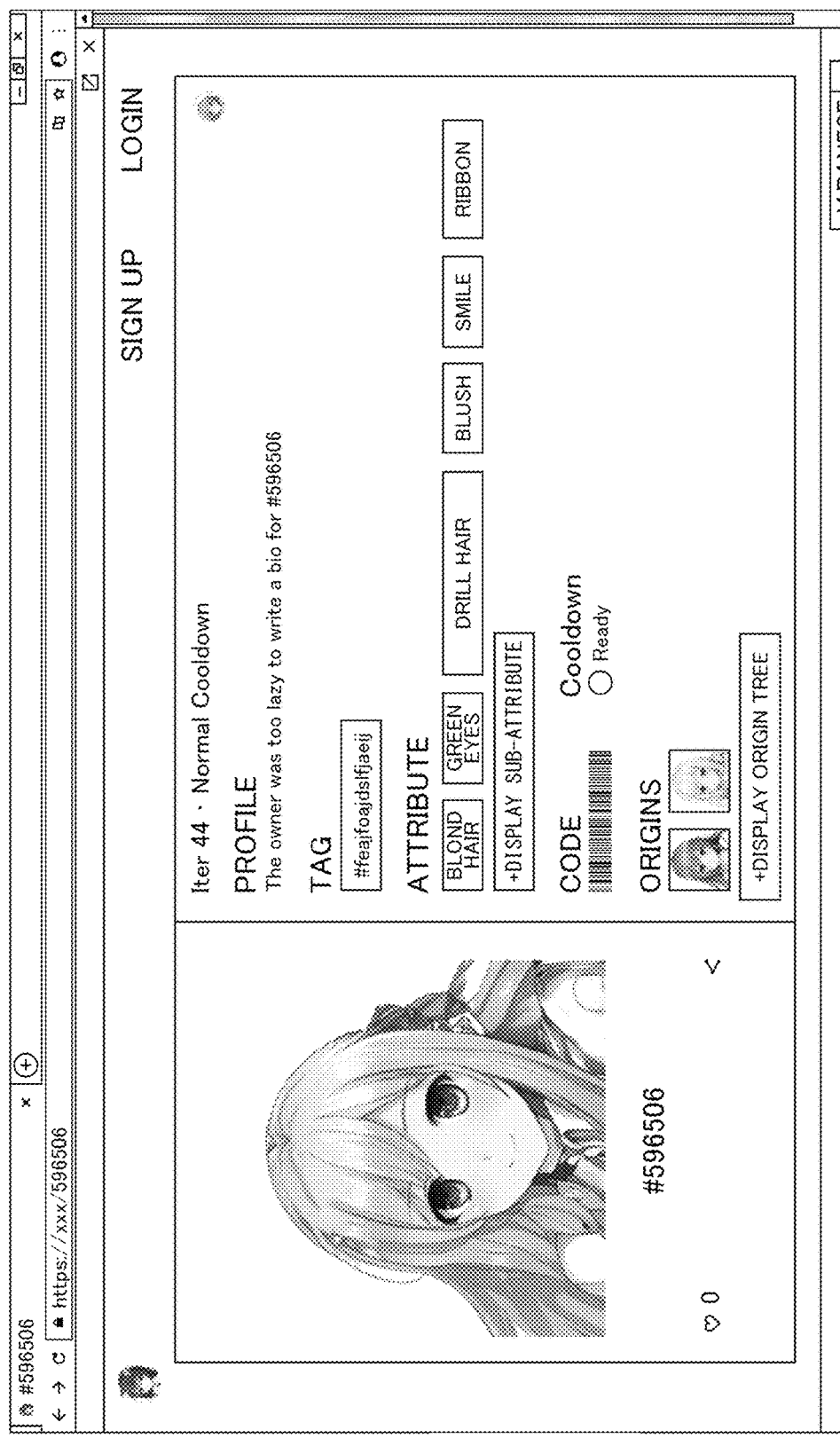
FIG. 7 is a diagram that depicts image information on a platform according to one embodiment of the present disclosure.
Figure 8:
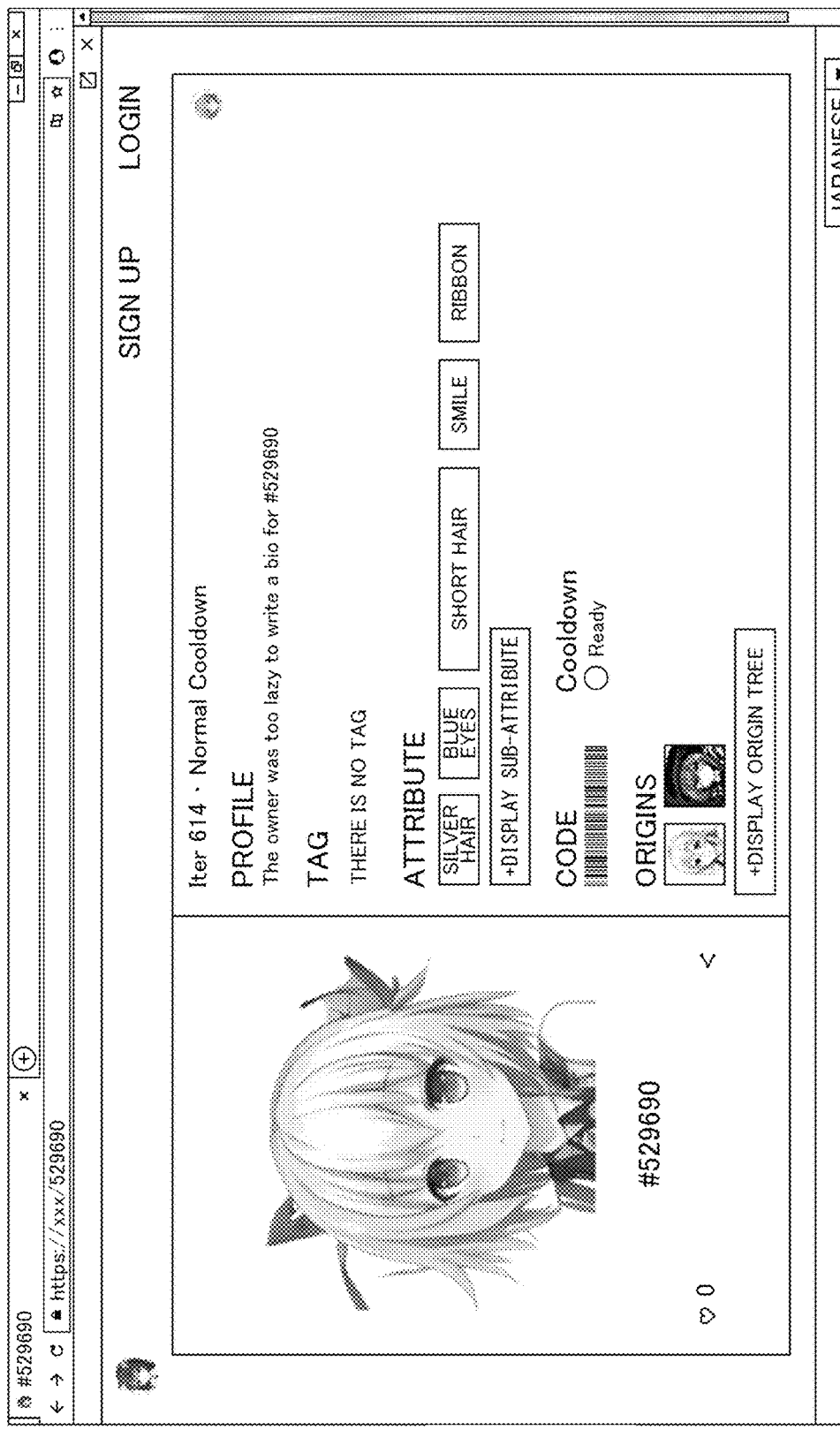
FIG. 8 is a diagram that depicts image information on a platform according to one embodiment of the present disclosure.

Specifically, the latent information may include a code and an attribute. Here, the code may represent a characteristic (for example, a body skeleton, a shape of a facial part or the like) specific to an object of interest, and the attribute may represent a variable characteristic (for example, a hair style, an expression or the like) of the object. For example, as illustrated in FIGS. 7 and 8, when a user chooses two images (#596506 and #529690) as to-be-fused images via a user interface where a code represented as a barcode is displayed together with various attributes and sub attributes (that is, attributes provided in the image, although they do not appear in the image) in association with the object image, the latent information acquisition unit 110 acquires codes (which are illustrated as $(Xc1, Xc2, \ldots, Xc(n-1), Xcn)$ and $(Yc1, Yc2, \ldots, Yc(n-1), Ycn)$ in the illustrated example) and attributes (which are illustrated as $(Xa1, Xa2, \ldots, Xa(m-1), Xam)$ and $(Ya1, Ya2, \ldots, Ya(m-1), Yam)$ in the illustrated example) associated with these two images and provides respective latent information of the images, which is composed of the acquired code and attributes, to the latent information fusion unit 120.

Figure 9:
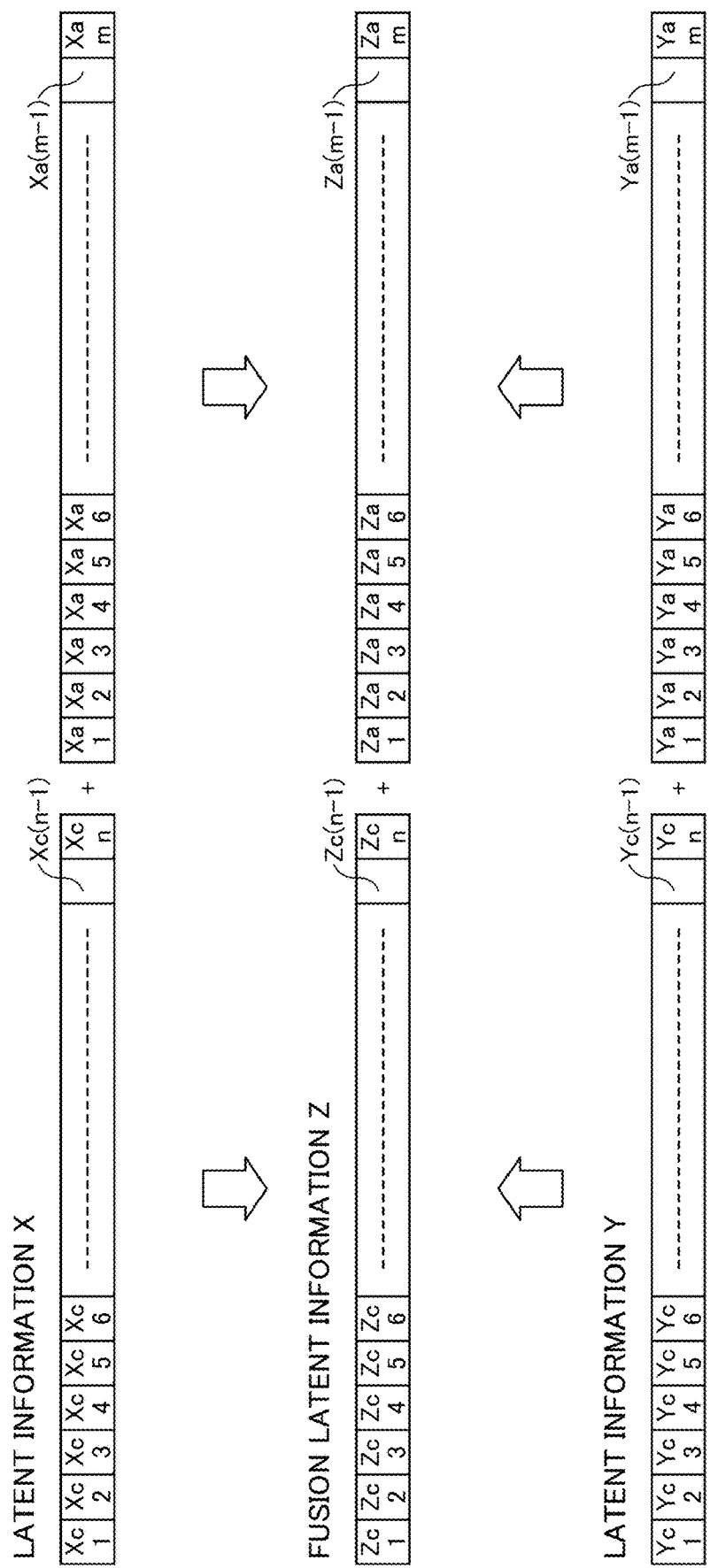
FIG. 9 is a diagram that depicts fusion of latent information according to one embodiment of the present disclosure.

The latent information fusion unit 120 fuses the latent information of the two images to generate fusion latent information. For example, upon acquiring the codes $(Xc1, Xc2, \ldots, Xc(n-1), Xcn)$ and $(Yc1, Yc2, \ldots, Yc(n-1), Ycn)$ and the attributes $(Xa1, Xa2, \ldots, Xa(m-1), Xam)$ and $(Ya1, Ya2, \ldots, Ya(m-1), Yam)$ from the latent information acquisition unit 110, the latent information fusion unit 120 performs a predetermined fusion operation on the acquired codes $(Xc1, Xc2, \ldots, Xc(n-1), Xcn)$ and $(Yc1, Yc2, \ldots, Yc(n-1), Ycn)$ and attributes $(Xa1, Xa2, \ldots, Xa(m-1), Xam)$ and $(Ya1, Ya2, \ldots, Ya(m-1), Yam)$ to generate fusion latent information composed of $(Zc1, Zc2, \ldots, Zc(n-1), Zcn)$ and $(Za1, Za2, \ldots, Za(m-1), Zam)$, as illustrated in FIG. 9.

Here, the fusion operation may be performed on a per-code basis and a per-attribute basis as illustrated. Alternatively, in other embodiments, the fusion operation may be performed on a per-latent information basis. Then, the latent information fusion unit 120 provides the generated fusion latent information to the fusion image generation unit 130. Also, the to-be-fused images may be unnecessarily two different images and may be the same image or three or more different images.

Figure 10:
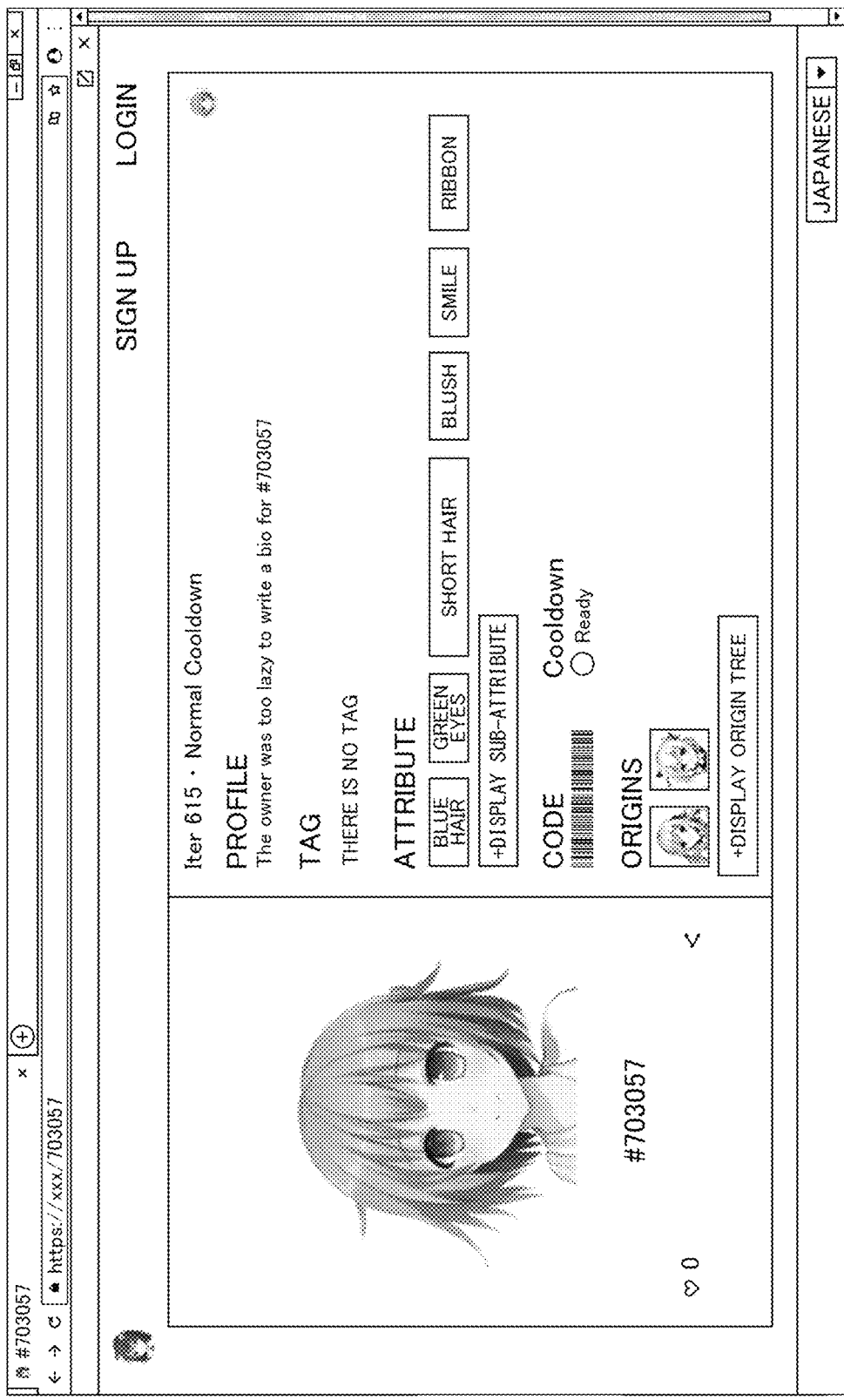
FIG. 10 is a diagram that depicts a fusion image according to one embodiment of the present disclosure.

The fusion image generation unit 130 supplies the fusion latent information to the trained generative model to generate a fusion image. For example, upon acquiring the fusion latent information $(Zc1, Zc2, \ldots, Zc(n-1), Zcn)$ and $(Za1, Za2, \ldots, Za(m-1), Zam)$ from the latent information fusion unit 120, the fusion image generation unit 130 supplies the acquired fusion latent information to the trained generative model to generate the fusion image as illustrated in FIG. 10 as its output. The generated fusion image is associated with the fusion latent information composed of the code $(Zc1, Zc2, \ldots, Zc(n-1), Zcn)$ and the attribute $(Za1, Za2, \ldots, Za(m-1), Zam)$, as illustrated. Also, the fusion image may be displayed in association with images of its two origins having a parent-child relationship. In addition, images of ancestors of the fusion image may be also displayed in the form of a family tree.

In one embodiment, the trained generative model may be a generator trained in accordance with GANs (Generative Adversarial Networks). For example, a training apparatus 200 may pre-train a generator and a discriminator, which are implemented as neural networks, as the GANs and provide them to the image generation apparatus 100.

In one exemplary training operation, a dataset of training images is provided to the training apparatus 200, and the training apparatus 200 supplies a code such as a vector of random numbers to the generator to acquire an image as its output. Next, the training apparatus 200 supplies either the image generated by the generator or a training image in the dataset to the discriminator to acquire, as its output, a discrimination result indicative of whether the incoming image is the image generated by the generator or the training image. Then, the training apparatus 200 updates parameters for the discriminator so that the discriminator may make correct discrimination. Also, the training apparatus 200 updates parameters for the generator so that the discriminator may make incorrect discrimination. If a predetermined termination condition such as completion of the above-stated operation on a predetermined number of incoming data is satisfied, the training apparatus 200 provides the finally acquired generator to the image generation apparatus 100 as the trained generative model.

Also, in another exemplary training operation, a dataset of training images with attributes is provided to the training apparatus 200, and the training apparatus 200 supplies a code such as a vector of random numbers and attributes to the generator to acquire an image as its output. Next, the training apparatus 200 supplies either the image generated by the generator or a training image in the dataset to the discriminator to acquire, as its output, a discrimination result indicative of not only whether the incoming image is the image generated by the generator or the training image but also what the attributes are. Then, the training apparatus 200 updates parameters for the discriminator so that the discriminator may make correct discrimination. In addition, the training apparatus 200 updates parameters for the generator so that the discriminator may make incorrect discrimination. If a predetermined termination condition such as completion of the above-stated operation on a predetermined number of incoming data is satisfied, the training apparatus 200 provides the finally acquired generator to the image generation apparatus 100 as the trained generative model.

The trained generative model according to the present disclosure is not limited to the above-stated generator or neural network trained in accordance with the GANs and may be any type of machine learning model trained in accordance with any other appropriate training scheme.

Figure 11:
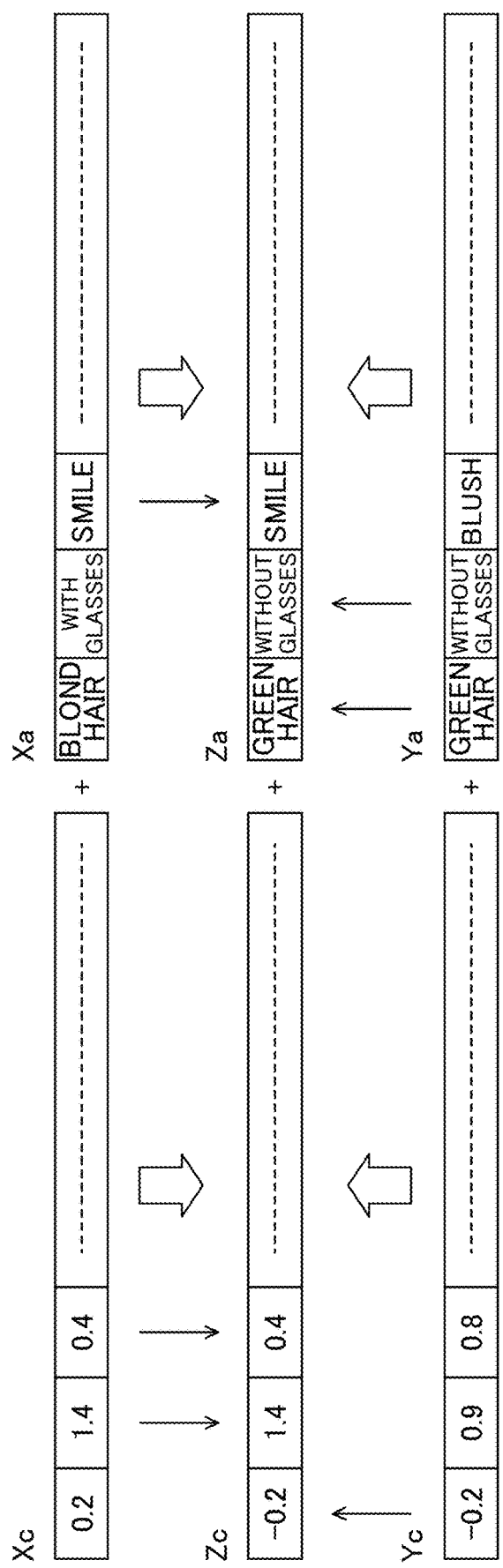
FIG. 11 is a diagram that depicts fusion of latent information in accordance with a genetic operation according to one embodiment of the present disclosure.

In one embodiment, the latent information fusion unit 120 may perform a genetic operation on the acquired latent information of the two images to generate the fusion latent information. For example, as illustrated in FIG. 11, the latent information fusion unit 120 may generate a fusion code and a fusion attribute through crossover of two codes and two attributes. In the example as illustrated, a code Xc and an attribute Xa in the to-be-fused latent information X are "0.2", "1.4", "0.4", . . . and "blond hair", "with glasses", "smile", . . . , respectively, and a code Yc and an attribute Ya in the to-be-fused latent information Y are "−0.2", "0.9", "0.8", . . . and "green hair", "without glasses", "blush", . . . , respectively.

Then, the latent information fusion unit 120 may perform crossover operations on elements of the codes Xc and Yc to generate a code Zc "−0.2", "1.4", "0.4", . . . in the fusion latent information Z, as illustrated. Also, the latent information fusion unit 120 may perform crossover operations on elements of the attributes Xa and Ya to generate an attribute Za "green hair", "with glasses", "smile", . . . , as illustrated. Here, the above-stated crossover operations are performed on a per-element basis, but the crossover operations according to the present embodiment are not limited to the above and may be performed per combination of an arbitrary number of elements.

Note that the genetic operations according to the present embodiment may include, but not limited to the crossover, other genetic operations such as mutation and selection. For example, in the mutation, the latent information fusion unit 120 may set a value other than that for elements of the to-be-fused latent information X and Y to one or more elements of the fusion latent information Z. Introduction of the mutation to the fusion operation can increase variations of the generated fusion latent information.

Also, in other embodiments, the latent information fusion unit 120 may generate the fusion latent information by averaging the acquired latent information of two images. For example, for elements of the latent information that are represented as numerical values, for example, "0.2" and "−0.2" as illustrated in FIG. 1, the corresponding elements of the fusion latent information may be determined as an average value of the corresponding elements of two images. In this case, for elements having alternative values (presence of attachments), for example, "with glasses" and "without glasses", the corresponding elements of the fusion latent information may be randomly determined as one of the two.

Also, in still further embodiments, the latent information fusion unit 120 may perform a logical operation or an arithmetic operation on the acquired latent information of two images to generate the fusion latent information. For example, the logical operation may include a logical OR operation, a logical AND operation, a logical exclusive OR operation, a logical NOT operation or the like. For example, the arithmetic operation may include addition, subtraction, multiplication, division or the like. For example, combinations of the arithmetic operations such as an arithmetic mean and a harmonic mean may be included. In addition, conversion (for example, an exponential operation or a logarithmic operation) or fluctuation (for example, a random noise) may be applied to the latent information of the two images, and then the arithmetic operation may be performed on the applied latent information. Alternatively, the arithmetic operation may be performed on the latent information of the two images, and then the conversion or the fluctuation may be applied (for example, a geometric mean or an exponential mean).

Also, in still further embodiments, the latent information fusion unit 120 may perform a combination of any one or more of the above-stated operations on the acquired latent information of the two images to generate the fusion latent information.

In one embodiment, the latent information may further include a sub attribute. The above-stated attribute (referred to as a main attribute hereinafter) is an attribute having a higher likelihood of its occurrence in a fusion image whereas the sub attribute is an attribute that does not appear in the origin image but is likely to appear in the fusion image with a lower occurrence likelihood. For example, the sub attribute may have similar contents (for example, a hair style, an expression or the like). Either the main attribute or the sub attribute may be stochastically selected and used to generate the fusion latent information. As illustrated in FIGS. 7, 8 and 10, the sub attribute may be also displayed on a user interface.

Figure 12A:
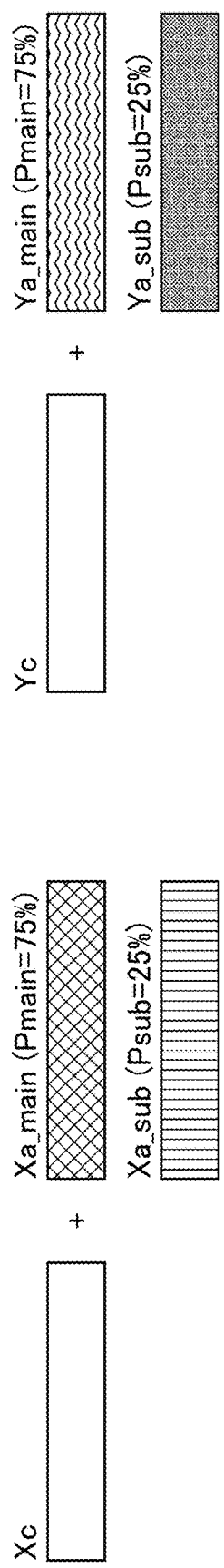
FIGS. 12A to 12C are diagrams that depict fusion of latent information according to another embodiment of the present disclosure.

For example, as illustrated in FIG. 12A, it is assumed that latent information X and latent information Y of two origins are composed of a code Xc, a main attribute Xa_main, and a sub attribute Xa_sub; and a code Yc, a main attribute Ya_main, and a sub attribute Ya_sub, respectively. Here, selection probability Pmain of the main attribute and selection probability Psub of the sub attribute may be preset (in the illustrated example, but not limited to, Pmain=75% and Psub=25%), and one of the attributes for use in generating the fusion latent information may be determined in accordance with the preset probabilities.

Figure 12B:
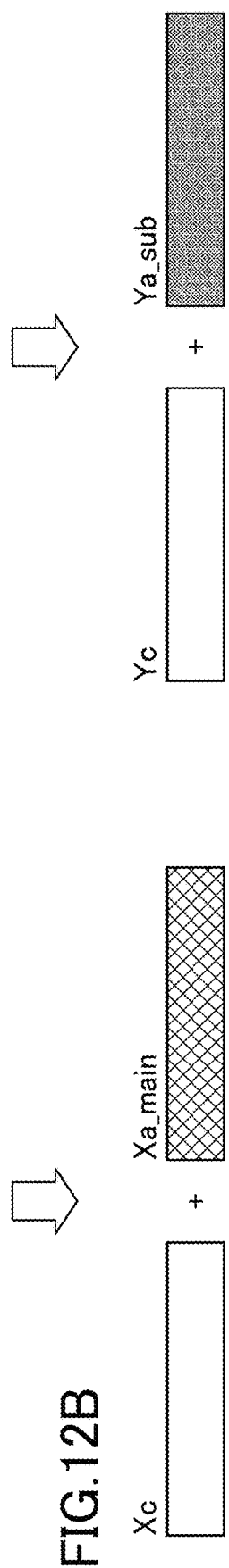

For example, in the example as illustrated in FIG. 12B, the main attribute Xa_main is selected for the latent information X, and the sub attribute Ya_sub is selected for the latent information Y. Here, a probability value at selection of the attributes may be set to different values for respective elements of the attributes. Also, either the main attribute or the sub attribute may be selected for respective elements of the attributes depending on the preset probability values.

Figure 12C:
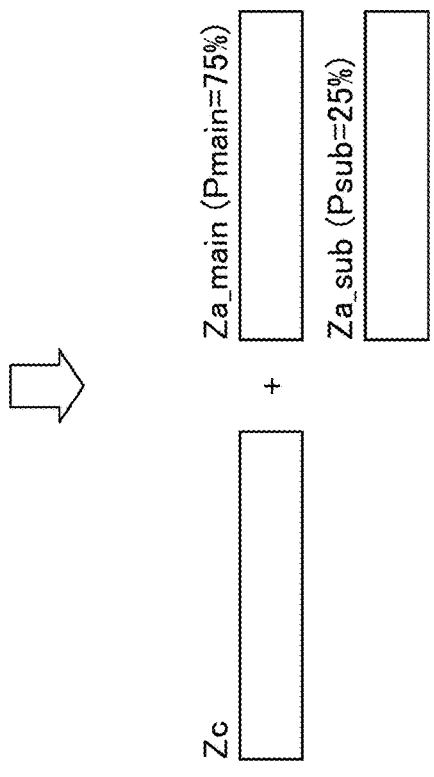

The latent information fusion unit 120 generates the fusion latent information Z as illustrated in FIG. 12C based on the selected latent information X (=Xc+Xa_main) and the selected latent information Y (=Yc+Ya_sub).

As illustrated, the fusion latent information Z may also include a main attribute Za_main and a sub attribute Za_sub. For example, in crossover of the to-be-fused attributes Xa_main and Ya_sub, the latent information fusion unit 120 may form the sub attribute Za_sub from elements that have not been selected for the main attribute Za_main in the fusion latent information Z in the crossover.

Here, if the fusion latent information Z includes the code Zc, the main attribute Za_main, and the sub attribute Za_sub, the generative model may be pre-trained so that the incoming main attribute Za_main can be weighted with a higher weight than the sub attribute Za_sub. Also, the main attribute and the sub attribute may be fused with weights and be supplied to the trained generative model. Alternatively, the fusion image generation unit 130 may generate the fusion image based on the code Zc and the main attribute Za_main without supplying the sub attribute Za_sub to the generative model.

In this manner, the introduction of the sub attribute can increase variations of the generated fusion latent information and can accordingly increase variations of the fusion images. The number of the sub attributes may be selected as desired.

Similarly, the latent information may further include a sub code. The above-stated code (referred to as a main code hereinafter) is a code having a higher likelihood of its occurrence in fusion images. On the other hand, the sub code is a code that does not appear in the origin image but is likely to appear in the fusion image with a lower occurrence likelihood. The sub code may be also displayed as a barcode or the like on a user interface.

Figure 13A:
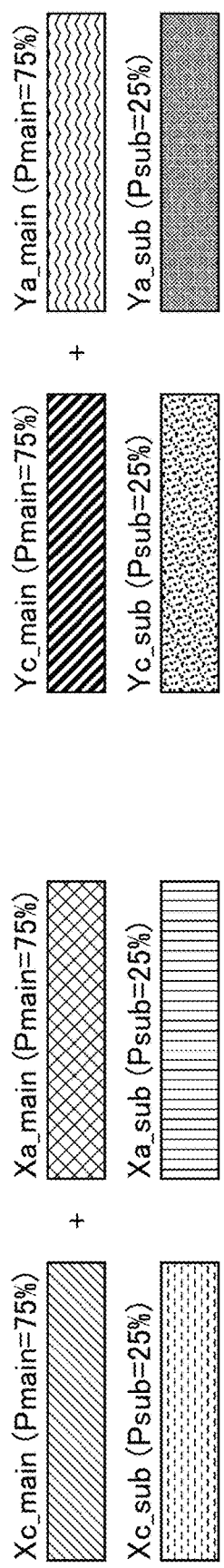
FIGS. 13A to 13C are diagrams that depict fusion of latent information according to another embodiment of the present disclosure.

For example, as illustrated in FIG. 13A, it is assumed that latent information X and latent information Y of two origins are composed of a main code Xc_main, a sub code Xc_sub, a main attribute Xa_main, and a sub attribute Xa_sub; and a main code Yc_main, a sub code Yc_sub, a main attribute Ya_main, and a sub attribute Ya_sub, respectively. Here, selection probability Pmain of the main code and selection probability Psub of the sub code may be preset (in the illustrated example, but not limited to, Pmain=75% and Psub=25%), and one of the codes for use in generating the fusion latent information may be determined in accordance with the preset probabilities.

Figure 13B:
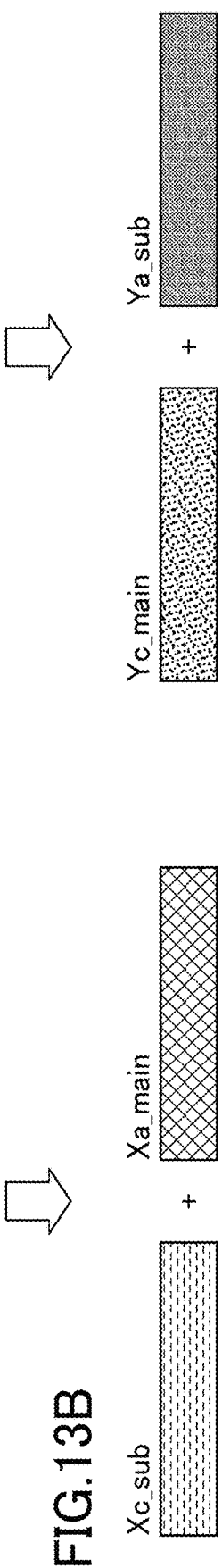

For example, in the example as illustrated in FIG. 13B, the sub code Xc_sub is selected for the latent information X, and the main code Yc_main is selected for the latent information Y. Here, a probability value at selection of the codes may be set to different values for respective elements of the codes. Also, either the main code or the sub code may be selected for respective elements of the codes depending on the preset probability values.

Figure 13C:
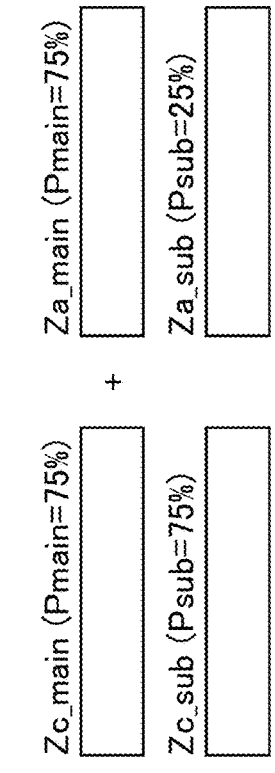

The latent information fusion unit 120 generates the fusion latent information Z as illustrated in FIG. 13C based on the selected latent information X (=Xc_sub+Xa_main) and the selected latent information Y (=Yc_main+Ya_sub).

As illustrated, the fusion latent information Z may also include a main code Zc_main and a sub code Zc_sub. For example, at crossover of the to-be-fused codes Xc_sub and Yc_main, the latent information fusion unit 120 may form the sub code Zc_sub from elements that have not been selected for the main code Zc_main in the fusion latent information Z in the crossover.

Here, similar to the main attribute Za_main and the sub attribute Za_sub, the generative model may be pre-trained so that the incoming main code Zc_main can be weighted with a higher weight than the sub code Zc_sub. Also, the main code and the sub code may be fused with weights, and the fused codes may be supplied to the trained generative model. Alternatively, the fusion image generation unit 130 may generate the fusion image based on the main code Zc_main and the main attribute Za_main without supplying the sub code Zc_sub to the generative model.

In this manner, the introduction of the sub code can increase variations of the generated fusion latent information and can accordingly increase variations of the fusion images.

Image Generation Operation and Training Operation

Figure 14:
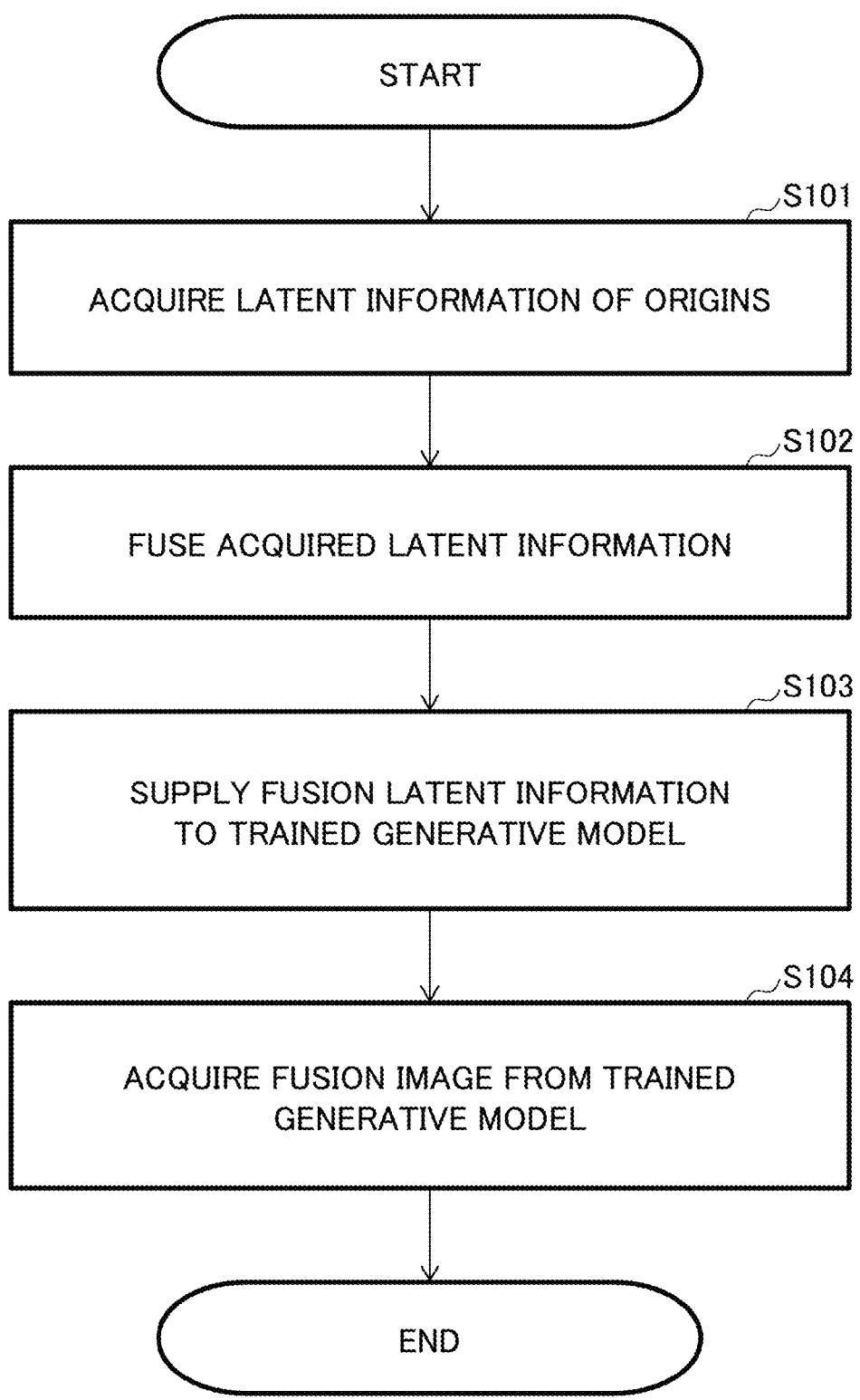
FIG. 14 is a flowchart that depicts an image generation operation according to one embodiment of the present disclosure.

Next, an image generation operation and a training operation according to one embodiment of the present disclosure are described with reference to FIGS. 14 and 15. FIG. 14 is a flowchart for illustrating an image generation operation according to one embodiment of the present disclosure. The image generation operation may be executed by the image generation apparatus 100, particularly a processor in the image generation apparatus 100.

As illustrated in FIG. 14, at step S101, the latent information acquisition unit 110 acquires latent information of two to-be-fused origins. Typically, the latent information of these origins is possessed by a user on a platform, and when the user indicates images of the to-be-fused origins, the latent information acquisition unit 110 acquires the latent information of the indicated origins from the platform and supplies the acquired latent information to the latent information fusion unit 120.

At step S102, the latent information fusion unit 120 fuses the acquired latent information. Specifically, the latent information fusion unit 120 may perform a genetic operation such as crossover on the acquired latent information to generate fusion latent information.

At step S103, the fusion image generation unit 130 supplies the acquired fusion latent information to a trained generative model. The generative model is pre-trained by the training apparatus 200 and may be a generator for GANs, for example. The trained generative model may be trained to generate images from the incoming latent information.

At step S104, the fusion image generation unit 130 generates a fusion image from the trained generative model. The generated fusion image is stored together with the latent information associated with the fusion image, that is, the incoming fusion latent information supplied to the trained generative model, in user's folder or the like on the platform.

Figure 15:
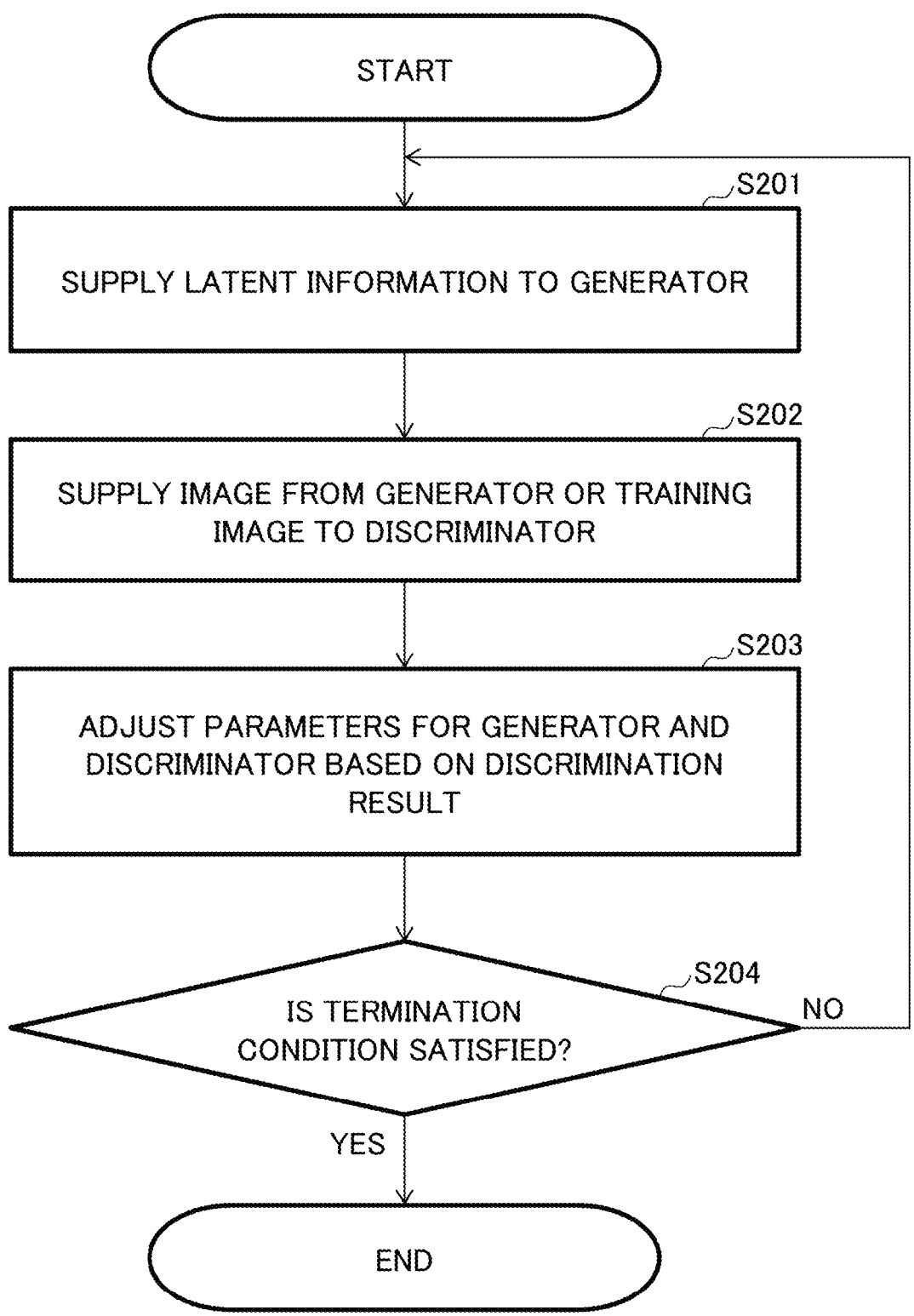
FIG. 15 is a flowchart that depicts a training operation in accordance with GANs (Generative Adversarial Networks) according to one embodiment of the present disclosure.

FIG. 15 is a flowchart for illustrating a training operation in accordance with GANs according to one embodiment of the present disclosure. The training operation is executed by the training apparatus 200, particularly a processor in the training apparatus 200, for a generator and a discriminator for GANs. In the training operation, a dataset of training images is provided to the training apparatus 200.

As illustrated in FIG. 15, at step S201, the training apparatus 200 supplies latent information that is composed of a code (noise) such as a vector of random numbers and random attributes, to the generator and acquires an image as its output.

At step S202, the training apparatus 200 supplies the acquired image or a training image in the dataset to the discriminator and acquires as its output a discrimination result indicative of whether the incoming image is the image generated by the generator or the training image. Here, an attribute may be supplied to the discriminator and may be outputted as the discrimination result.

At step S203, the training apparatus 200 adjusts parameters for the generator and the discriminator based on the discrimination result in accordance with a parameter update procedure for GANs. Specifically, the training apparatus 200 updates the parameters for the discriminator to cause the discriminator to yield correct discrimination results and updates the parameters for the generator to cause the discriminator to yield incorrect discrimination results.

At step S204, the training apparatus 200 determines whether a termination condition is satisfied, and if the termination condition is satisfied (S204: YES), the training apparatus 200 terminates the training operation. On the other hand, if the termination condition is not satisfied (S204: NO), the training apparatus 200 returns to step S201 and repeats the above-stated steps S201 to S204 for the next training data. For example, the termination condition may be completion of the training operation for a predetermined number of incoming data.

The training apparatus 200 provides the generator that has been acquired after completion of the training operation to the image generation apparatus 100 as the trained generative model.

Blockchain Compliant Code

Next, an image generation operation according to another embodiment of the present disclosure is described with reference to FIGS. 16 and 17. FIG. 16 is a schematic diagram for illustrating an image generation operation according to another embodiment of the present disclosure. In this embodiment, the latent information is provided in the form of a code compliant with a blockchain, and as a result, the latent information can be exchanged among users via a blockchain based distribution network.

As illustrated in FIG. 16, the latent information may be represented as a blockchain compliant code that is in compliance with any standard for blockchain based distribution networks such as Ethereum.

For example, in Ethereum, the latent information is described in 320 bits. Specifically, a code is described in 256 bits, and an attribute is described in 64 bits. In other words, the blockchain compliant code can represent the latent information with a smaller data amount, compared with a typical data amount (for example, 0.65 KB) of the latent information that is not represented in the form of the blockchain compliant code.

Correspondence between elements of the latent information that is represented in the form of a blockchain compliant code and the latent information that is not represented in the form of the blockchain compliant code may be defined, and the mutual relationship can be uniquely determined. For example, the image generation apparatus 100 may use the latent information in the form of the blockchain compliant code that a user has purchased from another user together with user's possessed another latent information to generate a fusion image from the purchased latent information and the possessed latent information.

Note that the blockchain compliant code is not limited to the above-stated Ethereum compliant code and may be codes in compliance with any other appropriate standard based on blockchain techniques. Throughout the specification, the terminology "latent information" may include not only the latent information that is not represented in the form of a blockchain compliant code but also the latent information that is represented in the form of the blockchain compliant code as described in the present embodiment.

Figure 17:
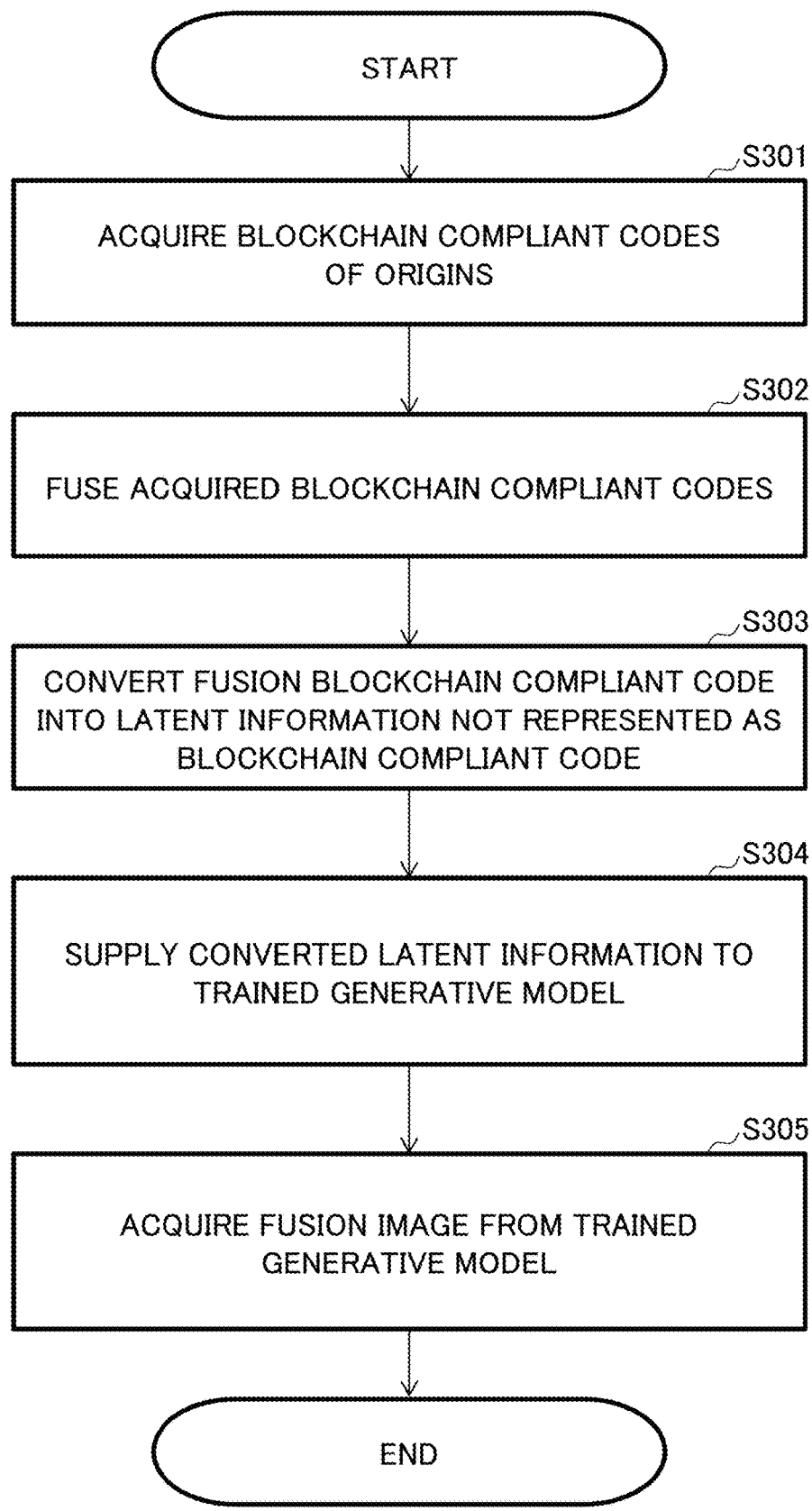
FIG. 17 is a flowchart that depicts an image generation operation according to another embodiment of the present disclosure.

FIG. 17 is a flowchart for illustrating an image generation operation according to another embodiment of the present disclosure. The image generation operation may be executed by the image generation apparatus 100, particularly a processor in the image generation apparatus 100.

As illustrated in FIG. 17, at step S301, the latent information acquisition unit 110 acquires blockchain compliant codes indicative of the latent information of two to-be-fused origins. For example, the blockchain compliant codes may be acquired from other users via a blockchain based platform. Here, some conversion operations of the latent information that is not represented in the form of a blockchain compliant code into the latent information that is represented in the form of the blockchain compliant code may be performed.

At step S302, the latent information fusion unit 120 fuses the acquired blockchain compliant codes. For example, the latent information fusion unit 120 may perform a genetic operation such as crossover on the acquired blockchain compliant codes to generate a fusion blockchain compliant code. Here, the fusion operation (including main-sub selection) described with reference to FIGS. 5 to 14 for the case where the blockchain compliant code is not used may be applied to the fusion operation on the blockchain compliant codes. The latent information represented in the form of the blockchain compliant code may at least include any one of the sub attribute and the sub code.

At step S303, the latent information fusion unit 120 converts the acquired fusion blockchain compliant code into fusion latent information. The conversion may be, for example, fulfilled in accordance with correspondence information indicative of correspondence between elements of the blockchain compliant codes and elements of the latent information that is not represented in the form of the blockchain compliant code.

At step S304, the fusion image generation unit 130 supplies the acquired fusion latent information to the trained generative model. The generative model is pre-trained by the training apparatus 200 and may be a generator for GANs, for example. The trained generative model is trained to generate images from the incoming latent information.

At step S305, the fusion image generation unit 130 generates a fusion image from the trained generative model. The generated fusion image may be stored together with the fusion latent information in user's folder on the platform.

Note that although the fusion operation is performed on the latent information represented in the form of the blockchain compliant code in the present embodiment, the present disclosure is not limited to it, and to-be-fused blockchain compliant codes may be first converted into the latent information that is not represented in the form of the blockchain compliant code, and then the fusion operation may be performed on the converted latent information.

In this manner, users can possess the latent information in the form of the blockchain compliant code having a smaller data amount, instead of the latent information having a larger data amount that is not represented in the form of the blockchain compliant code. Also, there is an advantage that the value and ownership of digital assets can be secured with blockchain and smart contract technology. Utilization of characteristics of the generative model allows two images in accordance with smart contract to be fused, and since results of the fusion are traceable and unpredictable, it is considered that games may be more interesting to users.

Next, an image generation system according to one embodiment of the present disclosure is described with reference to FIG. 18. In the present embodiment, all or a part of functions of the image generation apparatus 100 are provided as cloud services in the image generation system 10, and a user may generate and acquire fusion images via a user apparatus 300 such as a personal computer. For example, the image generation apparatus 100 may be located at a site different from the user apparatus 300.

As illustrated in FIG. 18, the image generation system 10 includes the image generation apparatus 100 and the user apparatus 300 communicatively coupled with the image generation apparatus 100.

When the user apparatus 300 indicates to-be-fused images to the image generation apparatus 100 via a network, the image generation apparatus 100 fuses latent information of the to-be-fused images based on the received indication to generate fusion latent information. Then, the image generation apparatus 100 supplies the generated fusion latent information to a trained generative model to generate a fusion image and sends the generated fusion image to the user apparatus 300. The user apparatus 300 acquires the fusion image generated by the image generation apparatus 100 via the network. Note that the to-be-fused latent information indicated by the user may be the latent information that is represented in the form of the blockchain compliant code or the latent information that is not represented in the form of the blockchain compliant code.

Also, the to-be-fused latent information is sent from the user apparatus 300 to the image generation apparatus 100 in FIG. 18, but information relating to two origin images indicated by the user may be sent from the user apparatus 300 to the image generation apparatus 100. In this case, the image generation apparatus 100 may acquire the to-be-fused latent information based on the user's indication.

Although the above-stated embodiments are focused on image generation, the present disclosure is not limited to it and may be applied to generation of any type of information that can be generated from the latent information, for example, a video, a sound or the like. In addition, the above-stated image generation technique may be used in games to generate new characters or the like.

Hardware Arrangement of Image Generation Apparatus, Training Apparatus, and User Apparatus In the image generation apparatus 100, the training apparatus 200, and the user apparatus 300 of the embodiments, respective functions may be implemented in a circuit that is formed of an analog circuit, a digital circuit or an analog-digital mixture circuit. Also, a control circuit for controlling the respective functions may be provided. The circuits may be implemented in an ASIC (Application Specific Integrated Circuit), a FPGA (Field Programmable Gate Array) or the like.

In all the above-stated embodiments, at least a part of the image generation apparatus 100, the training apparatus 200, and the user apparatus 300 may be arranged with hardware items. Also, if they are arranged with software items, a CPU (Central Processing Unit) or the like may implement them through information processing of the software items. In the case where they are arranged with software items, programs for implementing the image generation apparatus 100, the training apparatus 200, the user apparatus 300, and functions of at least a portion thereof are stored in a storage medium and may be loaded into a computer for execution. The storage medium is not limited to a removable storage medium such as a magnetic disk (for example, a flexible disk) or an optical disk (for example, a CD-ROM or a DVD-ROM) and may be a fixed type of storage medium such as a hard disk device or a SSD (Solid State Drive) using a memory device. In other words, the information processing with software items may be some specific implementations using hardware resources. In addition, processing with software items may be implemented in a circuit such as a FPGA and may be executed with hardware resources. Jobs may be executed by using an accelerator such as a GPU (Graphics Processing Unit), for example.

For example, by a computer reading dedicated software items stored in a computer-readable storage medium, the computer can be embodied as the above implementations. The type of storage medium is not limited to any specific one. By installing the dedicated software items downloaded via a communication network into a computer, the computer can serve as the above implementations. In this manner, information processing with the software items can be concretely implemented with hardware resources.

FIG. 19 is a block diagram for illustrating one exemplary hardware arrangement according to one embodiment of the present disclosure. Each of the image generation apparatus 100, the training apparatus 200, and the user apparatus 300 can be implemented as a computing device including a processor 101, a main memory device 102, an auxiliary storage device 103, a network interface 104, and a device interface 105, which are coupled via a bus 106.

Note that each of the image generation apparatus 100, the training apparatus 200, and the user apparatus 300 in FIG. 19 includes respective components singly, but the same component may be plurally provided. Also, although the image generation apparatus 100, the training apparatus 200, and the user apparatus 300 are singly illustrated, software items may be installed in multiple computers, and the multiple image generation apparatuses 100, the multiple training apparatuses 200, and the multiple user apparatuses 300 may perform different portions of software operations. In this case, each of the multiple image generation apparatuses 100, the multiple training apparatuses 200, and the multiple user apparatuses 300 may communicate with each other via the network interface 104 or the like.

The processor 101 is an electronic circuit (a processing circuit or a processing circuitry) including a controller and an arithmetic unit of the image generation apparatus 100, the training apparatus 200, and the user apparatus 300. The processor 101 performs arithmetic operations based on incoming data and programs from respective internal devices in the image generation apparatus 100, the training apparatus 200, and the user apparatus 300, and supplies operation results and control signals to the respective internal devices or the like. Specifically, the processor 101 runs operating systems (OS), applications or the like in the image generation apparatus 100, the training apparatus 200, and the user apparatus 300 to control respective components of the image generation apparatus 100, the training apparatus 200, and the user apparatus 300. The processor 101 is not particularly limited to any certain one and may be any other implementation that can perform the above operations. The image generation apparatus 100, the training apparatus 200, the user apparatus 300, and respective components thereof may be implemented with the processor 101. Here, the processing circuit may be one or more electric circuits disposed on a single chip or on two or more chips or devices. If the multiple electronic circuits are used, the respective electronic circuits may communicate with each other in a wired or wireless manner.

The main memory device 102 is a memory device for storing various data and instructions for execution by the processor 101, and information stored in the main memory device 102 is directly read by the processor 101. The auxiliary storage device 103 includes storage devices other than the main memory device 102. Note that the memory device and the storage device indicate arbitrary electronic parts capable of storing electronic information and may serve as memories or storages. Also, the memory device may be any of a volatile memory and a non-volatile memory. The memory device for storing various data in the image generation apparatus 100, the training apparatus 200, and the user apparatus 300 may be implemented with the main memory device 102 or the auxiliary storage device 103, for example. As one example, at least a portion of the memory device may be implemented in the main memory device 102 or the auxiliary storage device 103. As another example, if an accelerator is provided, at least a portion of the above-stated memory device may be implemented in a memory device within the accelerator.

The network interface 104 is an interface for connecting to a communication network 108 in a wired or wireless manner. The network interface 104 may be compliant with any of existing communication standards. Information may be exchanged with the external apparatus 109A communicatively coupled via the communication network 108 by using the network interface 104.

The external apparatus 109A may include a camera, a motion capture, an output device, an external sensor, an input device and so on, for example. Also, the external apparatus 109A may be an apparatus having a part of functions of components in the image generation apparatus 100, the training apparatus 200, and the user apparatus 300. Then, the image generation apparatus 100, the training apparatus 200, and the user apparatus 300 may receive a part of processing results of the image generation apparatus 100, the training apparatus 200, and the user apparatus 300 via the communication network 108 as in cloud services.

The device interface 105 is an interface such as a USB (Universal Serial Bus) directly coupled with the external apparatus 109B. The external apparatus 109B may be an external storage medium or a storage device. The memory device may be implemented with the external apparatus 109B.

The external apparatus 109B may be an output device. The output device may be a display device for displaying images or an output device for sounds or the like, for example. For example, the output device may be, but not limited to, a LCD (Liquid Crystal Display), a CRT (Cathode Ray Tube), a PDP (Plasma Display Panel), an organic EL (ElectroLuminescence) display, a speaker or the like.

Note that the external apparatus 109B may be an input device. The input device may include a device such as a keyboard, a mouse, a touch panel, a microphone, or the like, and incoming information from these devices is provided to the image generation apparatus 100, the training apparatus 200, and the user apparatus 300. Signals from the input device are supplied to the processor 101.

For example, the latent information acquisition unit 110, the latent information fusion unit 120, the fusion image generation unit 130, and the like in the image generation apparatus 100 according to the present embodiments may be implemented with one or more processors 101. Also, memory devices in the image generation apparatus 100, the training apparatus 200, and the user apparatus 300 may be implemented with the main memory device 102 or the auxiliary storage device 103. Also, the image generation apparatus 100 may include one or more memory devices.

In the specification, the representation "at least one of a, b and c" may include not only combinations a, b, c, a-b, a-c, b-c and a-b-c but also combinations of a plurality of the same elements a-a, a-b-b, a-a-b-b-c-c or the like. Also, the representation may cover arrangements including elements other than a, b and c such as the combination a-b-c-d.

Similarly, in the specification, the representation "at least one of a, b or c" may include not only combinations a, b, c, a-b, a-c, b-c and a-b-c but also combinations of a plurality of the same elements a-a, a-b-b, a-a-b-b-c-c or the like. Also, the representation may cover arrangements including elements other than a, b and c such as the combination a-b-c-d.

Although certain embodiments of the present disclosure have been described in detail, the present disclosure is not limited to the above-stated certain embodiments, and various modifications can be made within the spirit of the present disclosure as defined by claims.

What is claimed is:

1. An image generation apparatus comprising:
   at least one memory; and
   at least one processor configured to:
      acquire first latent information of a first image and second latent information of a second image, the first image including data related to a visual representation of a first object, and the second image including data related to a visual representation of a second object,
      generate fusion latent information by using the first latent information and the second latent information, and
      generate a fusion image by inputting the fusion latent information into a trained generative model, the fusion image including data related to a visual representation of a third object,
   wherein the at least one processor uses randomly determined information to generate the fusion latent information,
   wherein the first object, the second object, and the third object are respectively a first character, a second character, and a third character, the first character, the second character, and the third character being different from each other,
   wherein the visual representation of the first object indicates an appearance of the first character, the visual representation of the second object indicates an appearance of the second character, and the visual representation of the third object indicates an appearance of the third character, and
   wherein the first latent information includes information of at least one of a hair style, a hair color, an eye color, a skin color, an expression, or an attachment of the first character, the second latent information includes information of at least one of a hair style, a hair color, an eye color, a skin color, an expression, or an attachment of the second character, and the fusion latent information includes information of at least one of a hair style, a hair color, an eye color, a skin color, an expression, or an attachment of the third character.

2. The image generation apparatus as claimed in claim 1, wherein the at least one processor is configured to perform a genetic operation on the first latent information and the second latent information to generate the fusion latent information.

3. The image generation apparatus as claimed in claim 2, wherein the genetic operation includes at least one of crossover, mutation, or selection.

4. The image generation apparatus as claimed in claim 1, wherein the at least one processor is configured to fuse elements of the first latent information and elements of the second latent information to generate the fusion latent information.

5. The image generation apparatus as claimed in claim 1, wherein the at least one processor is configured to select elements of the first latent information and elements of the second latent information to generate the fusion latent information.

6. The image generation apparatus as claimed in claim 1, wherein the at least one processor is configured to perform at least one of an arithmetic operation or a logical operation of the first latent information and the second latent information to generate the fusion latent information.

7. The image generation apparatus as claimed in claim 1, wherein the first latent information includes main and sub information, and the second latent information includes main and sub information.

8. The image generation apparatus as claimed in claim 7, wherein the at least one processor is configured to:
select one of the main and the sub information of the first latent information,
select one of the main and the sub information of the second latent information, and
generate the fusion latent information by using the selected information of the first latent information and the selected information of the second latent information.

9. The image generation apparatus as claimed in claim 1, wherein the at least one processor is configured to generate the fusion latent information that includes main and sub information.

10. The image generation apparatus as claimed in claim 1, wherein the first latent information and the second latent information are represented in blockchain compliant codes.

11. The image generation apparatus as claimed in claim 1, wherein the trained generative model is a generator trained in accordance with a generative adversarial network.

12. The image generation apparatus as claimed in claim 1, wherein the at least one processor displays, on a display device, the first image, the second image, the fusion image, and the information of the at least one of the hair style, the hair color, the eye color, the skin color, the expression, or the attachment of the third character.

13. The image generation apparatus as claimed in claim 1, wherein the at least one processor displays, on a display device, the first image, the second image, and the fusion image in a form of a family tree.

14. The image generation apparatus as claimed in claim 1, wherein the using of the randomly determined information includes applying fluctuation by using a random noise.

15. The image generation apparatus as claimed in claim 1, wherein the using of the randomly determined information includes randomly determining an element of the fusion latent information.

16. The image generation apparatus as claimed in claim 1, wherein the use of the randomly determined information to generate the fusion latent information includes an application of fluctuation.

17. An image generation method comprising:
acquiring, by at least one processor, first latent information of a first image and second latent information of a second image, the first image including data related to a visual representation of a first object, and the second image including data related to a visual representation of a second object,
generating, by the at least one processor, fusion latent information by using the first latent information and the second latent information, and
generating, by the at least one processor, a fusion image by inputting the fusion latent information into a trained generative model, the fusion image including data related to a visual representation of a third object,
wherein the generating of the fusion latent information includes generating, by the at least one processor, the fusion latent information by using randomly determined information,
wherein the first object, the second object, and the third object are respectively a first character, a second character, and a third character, the first character, the second character, and the third character being different from each other,
wherein the visual representation of the first object indicates an appearance of the first character, the visual representation of the second object indicates an appearance of the second character, and the visual representation of the third object indicates an appearance of the third character, and
wherein the first latent information includes information of at least one of a hair style, a hair color, an eye color, a skin color, an expression, or an attachment of the first character, the second latent information includes information of at least one of a hair style, a hair color, an eye color, a skin color, an expression, or an attachment of the second character, and the fusion latent information includes information of at least one of a hair style, a hair color, an eye color, a skin color, an expression, or an attachment of the third character.

18. The image generation method as claimed in claim 17, wherein the generating of the fusion image includes performing a genetic operation on the first latent information and the second latent information.

19. The image generation method as claimed in claim 18, wherein the genetic operation includes at least one of crossover, mutation, or selection.

20. An image generation apparatus comprising:
at least one memory; and
at least one processor configured to:
acquire first latent information of a first image and second latent information of a second image, the first image including data related to a visual representation of a first object, and the second image including data related to a visual representation of a second object, generate fusion latent information by using the first latent information and the second latent information, and generate a fusion image by inputting the fusion latent information into a trained generative model, the fusion image including data related to a visual representation of a third object, wherein the at least one processor displays, on a display device, the first image, the second image, and the fusion image in a form of a family tree, wherein the first object, the second object, and the third object are respectively a first character, a second character, and a third character, the first character, the second character, and the third character being different from each other, wherein the visual representation of the first object indicates an appearance of the first character, the visual representation of the second object indicates an appearance of the second character, and the visual representation of the third object indicates an appearance of the third character, and wherein the first latent information includes information of at least one of a hair style, a hair color, an eye color, a skin color, an expression, or an attachment of the first character, the second latent information includes information of at least one of a hair style, a hair color, an eye color, a skin color, an expression, or an attachment of the second character, and the fusion latent information includes information of at least one of a hair style, a hair color, an eye color, a skin color, an expression, or an attachment of the third character.

21. The image generation apparatus as claimed in claim 20, wherein the at least one processor uses randomly determined information to generate the fusion latent information.

22. The image generation apparatus as claimed in claim 20, wherein the at least one processor displays, on the display device, the information of the at least one of the hair style, the hair color, the eye color, the skin color, the expression, or the attachment of the third character.

23. An image generation method comprising:

acquiring, by at least one processor, first latent information of a first image and second latent information of a second image, the first image including data related to a visual representation of a first object, and the second image including data related to a visual representation of a second object, generating, by the at least one processor, fusion latent information by using the first latent information and the second latent information, generating, by the at least one processor, a fusion image by inputting the fusion latent information into a trained generative model, the fusion image including data related to a visual representation of a third object, and displaying, by the at least one processor, on a display device, the first image, the second image, and the fusion image in a form of a family tree, wherein the first object, the second object, and the third object are respectively a first character, a second character, and a third character, the first character, the second character, and the third character being different from each other, wherein the visual representation of the first object indicates an appearance of the first character, the visual representation of the second object indicates an appearance of the second character, and the visual representation of the third object indicates an appearance of the third character, and wherein the first latent information includes information of at least one of a hair style, a hair color, an eye color, a skin color, an expression, or an attachment of the first character, the second latent information includes information of at least one of a hair style, a hair color, an eye color, a skin color, an expression, or an attachment of the second character, and the fusion latent information includes information of at least one of a hair style, a hair color, an eye color, a skin color, an expression, or an attachment of the third character.

24. The image generation method as claimed in claim 23, wherein the generating of the fusion latent information includes generating the fusion latent information by using randomly determined information.

25. The image generation method as claimed in claim 23, further comprising:

displaying, by the at least one processor, on the display device, the information of the at least one of the hair style, the hair color, the eye color, the skin color, the expression, or the attachment of the third character.

* * * * *